(12) United States Patent
Kanemaru et al.

(10) Patent No.: US 10,452,206 B2
(45) Date of Patent: Oct. 22, 2019

(54) PROJECTION VIDEO DISPLAY DEVICE AND VIDEO DISPLAY METHOD

(71) Applicant: MAXELL, LTD., Kyoto (JP)

(72) Inventors: Takashi Kanemaru, Tokyo (JP); Shinichi Obata, Tokyo (JP); Mitsuhiro Kitani, Tokyo (JP); Takashi Matsubara, Tokyo (JP); Takehiro Niikura, Tokyo (JP)

(73) Assignee: MAXELL, LTD., Kyoto (JP)

( * ) Notice: Subject to any disclaimer, the term of this patent is extended or adjusted under 35 U.S.C. 154(b) by 24 days.

(21) Appl. No.: 15/533,800

(22) PCT Filed: Dec. 8, 2014

(86) PCT No.: PCT/JP2014/082439
§ 371 (c)(1),
(2) Date: Jun. 7, 2017

(87) PCT Pub. No.: WO2016/092617
PCT Pub. Date: Jun. 16, 2016

(65) Prior Publication Data
US 2017/0329458 A1 Nov. 16, 2017

(51) Int. Cl.
*G06F 3/042* (2006.01)
*G06F 3/0488* (2013.01)
(Continued)

(52) U.S. Cl.
CPC .......... *G06F 3/0425* (2013.01); *G06F 3/0416* (2013.01); *G06F 3/04883* (2013.01);
(Continued)

(58) Field of Classification Search
CPC .......... G06F 3/0425–0426; G06F 3/042–0428; G06F 3/04883; G06K 9/00355
See application file for complete search history.

(56) References Cited

U.S. PATENT DOCUMENTS

2012/0098865 A1 4/2012 Takano et al.
2012/0313910 A1* 12/2012 Haraguchi .......... H04N 9/3179
345/207
(Continued)

FOREIGN PATENT DOCUMENTS

EP 2685368 A2 7/2013
JP H08-211979 A 8/1996
(Continued)

OTHER PUBLICATIONS

International Search Report WO 2016/092617 A1, dated Feb. 10, 2015.

*Primary Examiner* — Laurence J Lee
(74) *Attorney, Agent, or Firm* — Volpe and Koenig, P.C.

(57) ABSTRACT

A projection video display device includes: a projection unit projecting a display video upon a projection surface; an image capture unit; detection units detecting the states of manipulation objects which carry out actions for the input manipulation; a manipulation instruction information generating unit, on the basis of the states of the manipulation objects which the detection units have detected, generating manipulation instruction information indicating a description of the input manipulation; and a communication unit connecting to the information processing device. The detection units detect movements of manipulation objects and attributes which represent the states of manipulation objects other than the movements. The manipulation instruction information generating unit generates, first control information for carrying out the pointer manipulation input upon the information processing device, and, on the basis of the attributes of the manipulation objects, second control information for carrying out a prescribed key input upon the information processing device.

11 Claims, 27 Drawing Sheets

(51) Int. Cl.
*G06F 3/041* (2006.01)
*G06K 9/00* (2006.01)
*G06K 9/20* (2006.01)

(52) U.S. Cl.
CPC ....... *G06K 9/00355* (2013.01); *G06K 9/2036* (2013.01); *G06F 2203/04101* (2013.01); *G06F 2203/04808* (2013.01)

(56) References Cited

U.S. PATENT DOCUMENTS

| | | |
|---|---|---|
| 2013/0249790 A1 | 9/2013 | Takasu |
| 2014/0253512 A1 | 9/2014 | Narikawa et al. |

FOREIGN PATENT DOCUMENTS

| | | |
|---|---|---|
| JP | 2000-298544 A | 10/2000 |
| JP | 2012-068690 A | 4/2012 |
| JP | 2012-089083 A | 5/2012 |
| JP | 2012-104096 A | 5/2012 |
| JP | 2013-239089 A | 11/2013 |
| JP | 2014-174833 A | 9/2014 |

\* cited by examiner

FIG.2
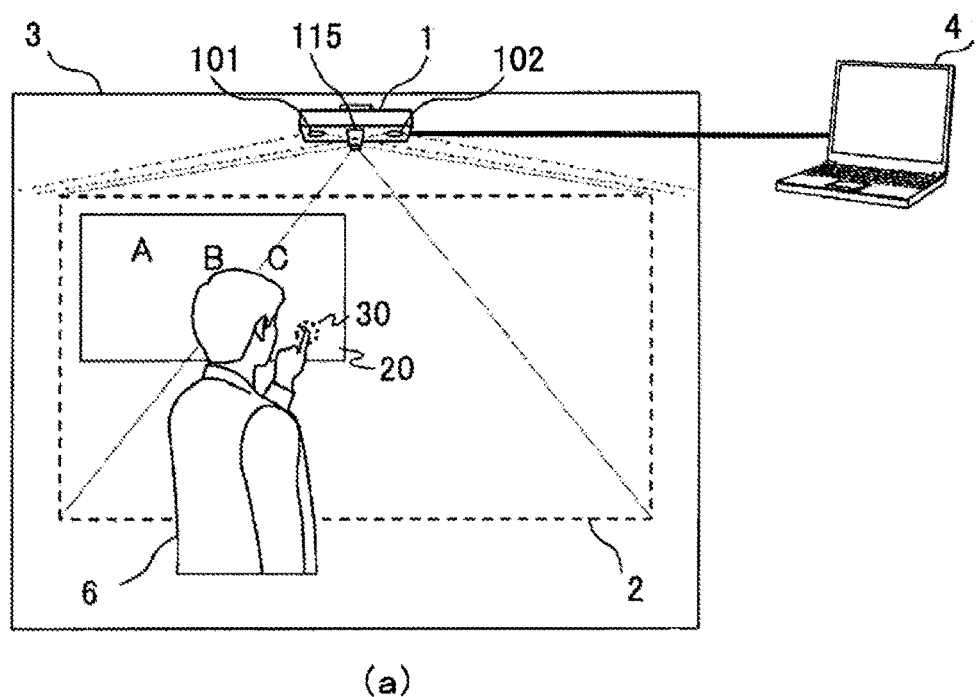
(a)
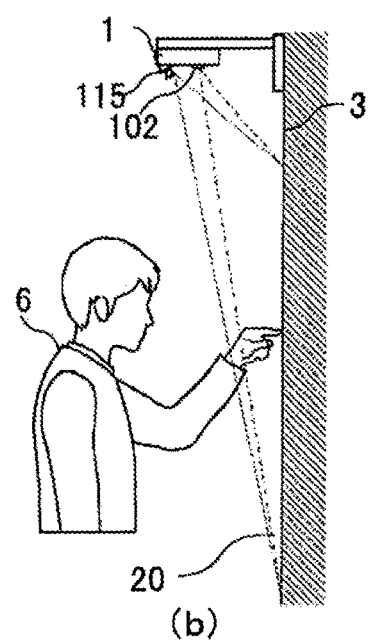
(b)

FIG.14

| PROXIMITY A BETWEEN FINGER AND OPERATING SURFACE | SWITCH OPERATION MODE | SWITCH POINTER DISPLAY |
|---|---|---|
| LEVEL 5 | TOUCH OPERATION MODE | DISPLAYED |
| LEVEL 4 | AERIAL OPERATION MODE | DISPLAYED |
| LEVEL 3 | AERIAL OPERATION MODE | NOT DISPLAYED |
| LEVEL 2 | OPERATION OFF MODE | NOT DISPLAYED |
| LEVEL 1 | OPERATION OFF MODE | NOT DISPLAYED |

FIG.15
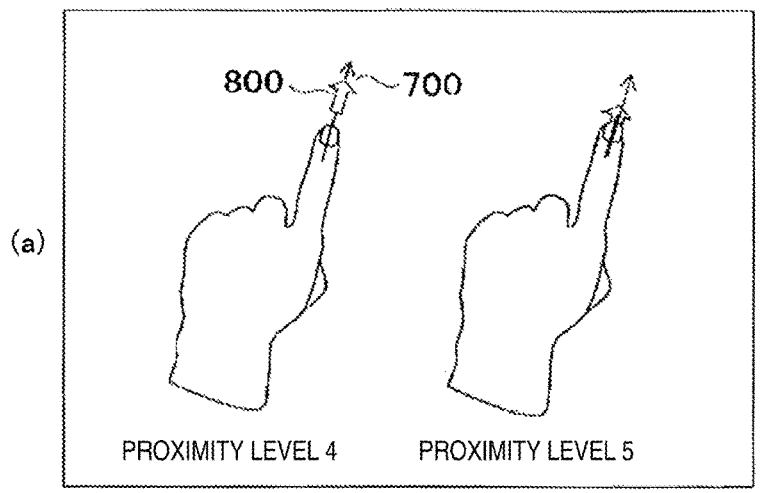
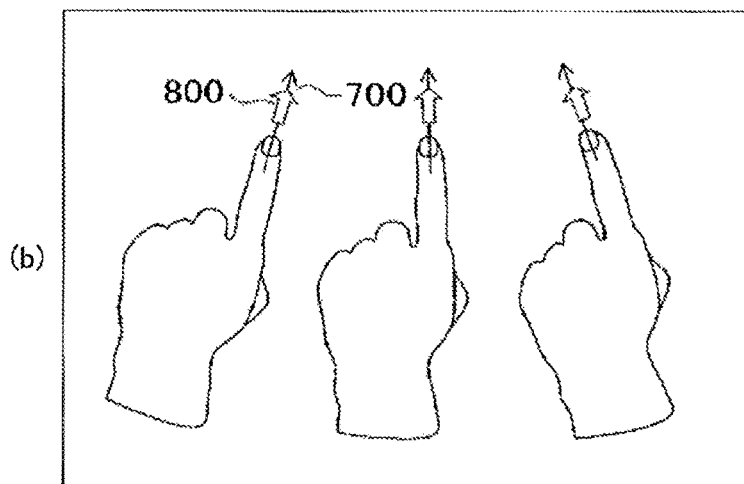
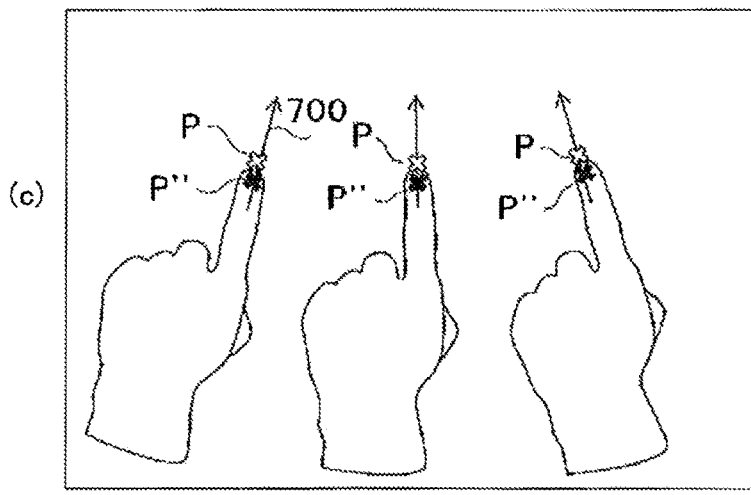

FIG.18

| COLUMN A | | COLUMN B | COLUMN C |
|---|---|---|---|
| FUNCTION | | OPERATION BY PC | OPERATION BY PROJECTION DEVICE |
| POINTER OPERATION | | MOUSE OPERATION | AERIAL OPERATION WITH ANY ONE FINGER OF RIGHT HAND |
| WRITE | | - | MOVE ANY ONE FINGER OF RIGHT HAND BY TOUCH OPERATION |
| DELETE (ERASER) | | - | MOVE BY MULTI-TOUCH OPERATION BY RIGHT HAND |
| OBJECT CONTROL | TRANSLATION (X, Y) | DRAG MOUSE (LATERALLY ALONG X-AXIS, VERTICALLY ALONG Y-AXIS) | MOVE PLURAL FINGERS OF RIGHT HAND BY AERIAL OPERATION (LATERALLY ALONG X-AXIS, VERTICALLY ALONG Y-AXIS) |
| | ROTATION (X, Y) | DRAG MOUSE WHILE PRESSING DOWN Ctrl KEY (LATERALLY ALONG X-AXIS, VERTICALLY ALONG Y-AXIS) | MOVE RIGHT HAND BY AERIAL OPERATION WHILE CARRYING OUT TOUCH OPERATION WITH MIDDLE FINGER OF LEFT HAND (LATERALLY ALONG X-AXIS, VERTICALLY ALONG Y-AXIS) |
| | ROTATION (Z) | DRAG MOUSE LATERALLY WHILE PRESSING DOWN Ctrl KEY AND Alt KEY | MOVE LATERALLY BY AERIAL OPERATION BY RIGHT HAND WHILE CARRYING OUT TOUCH OPERATION WITH MIDDLE FINGER AND INDEX FINGER OF LEFT HAND |
| | EXPANSION/REDUCTION (= TRANSLATION Z) | DRAG MOUSE VERTICALLY WHILE PRESSING DOWN Alt KEY | MOVE RIGHT HAND BY AERIAL OPERATION WHILE CARRYING OUT TOUCH OPERATION WITH INDEX FINGER OF LEFT HAND |

FIG.20
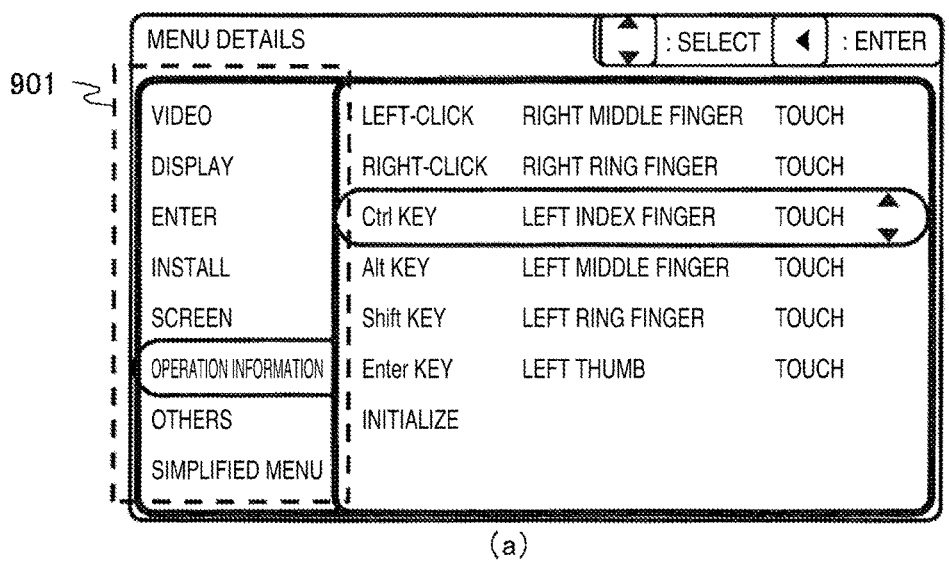
(a)
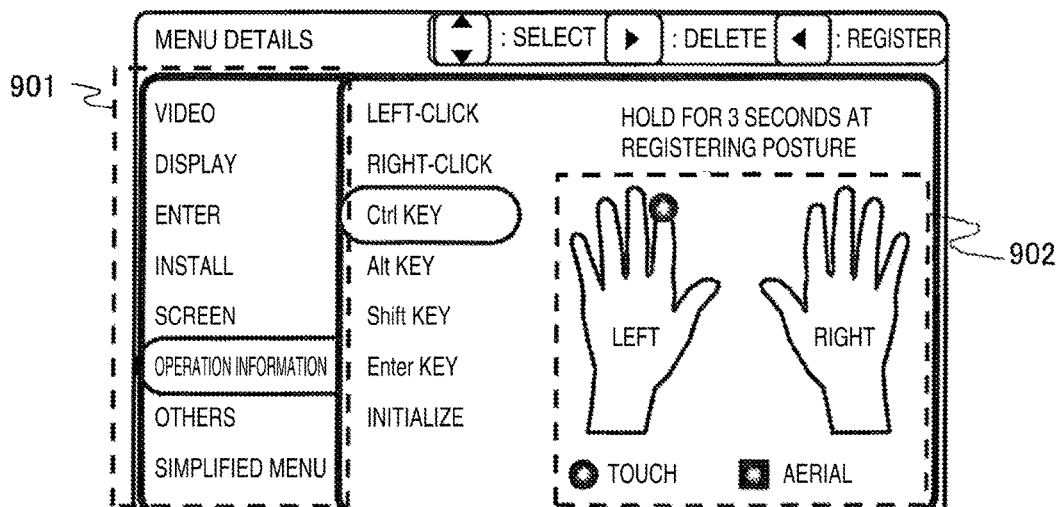
(b)

| USER OPERATION | | | RESPONSE | |
|---|---|---|---|---|
| FRONT | SIDE | FRONT VIEW | DESCRIPTION | |
| OPERATION 1 | | | 804 / 801 | DETERMINE WRITE OPERATION WITH NORMAL TOUCH OPERATION |
| OPERATION 2 | | | 802 | DETECT TOUCHING OF FIST PORTION AND DETERMINE FINGER TOUCH OPERATION IS INVALID |
| OPERATION 3 | | | 802 | RECOGNIZE CONTACT OF FIST PORTION, BUT DETERMINE AREAL OPERATION BECAUSE FINGER PORTION DO NOT TOUCH |
| OPERATION 4 | | | 802 | DETERMINE FRONT AND BACK OF HAND AND DETERMINE FINGER TOUCH OPERATION IS INVALID |

FIG.26

| USER OPERATION | | | RESPONSE | |
|---|---|---|---|---|
| | FRONT | SIDE | FRONT VIEW | DESCRIPTION |
| OPERATION 1 | | | NORMAL PEN (801, 804) | NORMAL TOUCH OPERATION AND DETERMINE WRITE OPERATION WITH NORMAL PEN |
| OPERATION 2 | | | BOLD PEN (801, 804) | STRONGLY PRESSED TOUCH OPERATION AND DETERMINE WRITE OPERATION WITH BOLD PEN |

PROJECTION VIDEO DISPLAY DEVICE AND VIDEO DISPLAY METHOD

TECHNICAL FIELD

The present invention relates to a projection video display technique for projecting an image.

BACKGROUND ART

Many technologies have been devised for devices that project video for display.

PATENT LITERATURE 1 discloses the following technique: "It is an object to provide a hand and finger gesture detection device capable of detecting a state of a hand and a finger quickly at low cost. The hand and finger gesture detection device includes a plurality of light sources, a camera, and an image recognition unit. The plurality of light sources emit light from plural positions to the hand and finger that is entered onto a detection surface, thus forming a plurality of shadow images of the hand and finger onto the detection surface, with each shadow corresponding to individual irradiating light. The camera is disposed at a position vertically away from the detection surface to pick up the plurality of shadow images and hand and finger images formed by the plurality of light sources. The image recognition unit recognizes the plurality of shadow images and hand and finger images picked up by the camera, and detects the state of the hand and finger entered onto the detection surface according to the state of the shadow images and the hand and finger images (excerpt from abstract)".

PATENT LITERATURE 2 discloses the following technique: "It is an object to provide an information display device that easily determines a hand and finger of a user used for operation. A display control device controls display content of a display device in accordance with the movement of a hand of the user. The display control device includes an identification unit that identifies the hand of the user as a hand for operation when the hand of the user is recognized as being directed in the same direction as the face of the user, in accordance with a detection result of a detection sensor that detects a spatial position of the body of the user, an instruction acquiring unit that recognizes the movement of the hand for operation and acquires an operating instruction for the display content of the display device, and a display control unit that controls the display content of the display device in accordance with the operating instruction (excerpt from abstract)".

PATENT LITERATURE 3 discloses the following technique: "It is an object to provide an operation display device which can accurately determine whether touch operations simultaneously detected at a plurality of points are a multi-touch operation by one operator or individual single touch operations by a plurality of operators. When a plurality of touch operations on a display screen are simultaneously detected, the operation display device determines whether the plurality of touch operations are carried out by one operator or a plurality of operators on the basis of finger forms (e.g., similarity between areas or forms of contact parts, or consistency/inconsistency of directions of fingertips) related to individual touch operations detected by a finger form detection unit, and changes display content of the display unit in accordance with the result of determination (excerpt from abstract)".

PATENT LITERATURE 4 discloses the following technique: "It is an object to enable input by discriminating a command based on movement of an object such as a hand of a user and a command based on a gesture of the object other than the movement. An input user interface device includes an electronic camera which picks up an image including an object image, a shape detection unit which detects a shape of the object image in the image picked up by the electronic camera, a gesture detection unit which detects a gesture of the object image in the image picked up by the electronic camera, and a control unit which decides a command on the basis of the shape detected by the shape detection unit and the gesture detected by the gesture detection unit (excerpt from abstract)".

CITATION LIST

Patent Literature

PATENT LITERATURE 1: JP2012-68690A
PATENT LITERATURE 2: JP2013-239089A
PATENT LITERATURE 3: EP2685368A
PATENT LITERATURE 4: US2013/0249790A

SUMMARY OF INVENTION

Technical Problem

The technique of PATENT LITERATURE 1 lacks versatility in installation of the projection surface, because the camera is installed vertically relative to the detection surface.

The technique of PATENT LITERATURE 2 has a narrow operation range, because the operation b hands and fingers is only, available immediately before the operator The technique of PATENT LITERATURE 3 identifies the position of the operator, the direction of the operation, and so on, in accordance with the area or shape of the contact part, so that much room is left to improve in accuracy of the recognition, because it is not guaranteed whether an operator executes routine operations regularly or the styles of the operations resemble each other when the operations are executed by different operators, The technique of PATENT LITERATURE 4 transmits only the information of position moving operation of the pointer to a computer, thus limiting the use of the hand and finger operations. In any technique described above, much room seems to be left to improve usefulness of the device by recognizing and using the shape, movement, and the like of the hands and fingers of the user.

The present invention has been made in view of the above situation, and it is an object of the present invention to provide a technique to further improve operability of the projection video display device.

Solution to Problem

To solve the above problem, the present invention provides a projection video display device including a projection unit that projects display video on a projection surface and, an image pickup unit that picks up the projection surface and outputs the picked-up image. The projection video display device is connected to an external information processing device that receives an input operation by pointer operation input and key input. In accordance with the picked-up image, a movement of an operation object, which carries out an action for an input operation to the information processing device, and an attribute indicating a state of the operation object other than the movement of the operation object are detected. In accordance with the movement of the operation object, first control information for allowing the pointer operation input to the external information processing device and second control information for carrying out the predetermined key input to the external information processing device in accordance with the attribute of the operation object detected by the detection unit are generated. The first control information and the second control information are transmitted to the external information processing device. The video indicating at least a mark indicating an operation pointer which is generated in accordance with the first control information and the second control information, or the operation mode is projected on the projection surface.

Advantageous Effects of Invention

According to the present invention, it is possible to further improve operability of the projection video display device. Other problems, configurations, and effects that are not described above will be apparent in the following description of embodiments.

BRIEF DESCRIPTION OF DRAWINGS

FIG. 2 illustrates an example of installing a projection video display device 1 on the wall and an example of operation by a user 6, in which (a) is a front view and (b) is a side view.

FIG. 14 illustrates a control example according to the proximity of fingers.

FIG. 15 illustrates a control example according to the finger-pointing direction in a display control unit 111, in which (a) illustrates correction of a pointer display position, (b) illustrates correction of a pointer display direction, and (c) illustrates correction of the contact point.

FIG. 18 illustrates an example of the operation method for viewing three-dimensional CAD data drawings.

FIG. 20 illustrates an operation information registration screen for setting corresponding relation between the shape of hands and fingers and the operating instruction information, in which (a) is a screen example for selecting the shape of hands and fingers using options and (b) is a screen example using illustration of hands and fingers.

FIG. 23 illustrates the shape of the hands and fingers for the user operations from the front and the side, in association with the response output from the projection video display device 1 responding to the user operations.

FIG. 26 illustrates the gesture operations with different finger pressure in association with pens that differ in boldness, in which (a) illustrates a normal touch operation and (b) illustrates a stronger touch operation (with a larger touch area of the fingertip).

DESCRIPTION OF EMBODIMENTS

Embodiments of the present invention will be described below by referring to the attached drawings. The same reference signs are given to the same constituent components of the drawings, and the description of those constituent components will not be repeated.

<First Embodiment>

Figure 1:
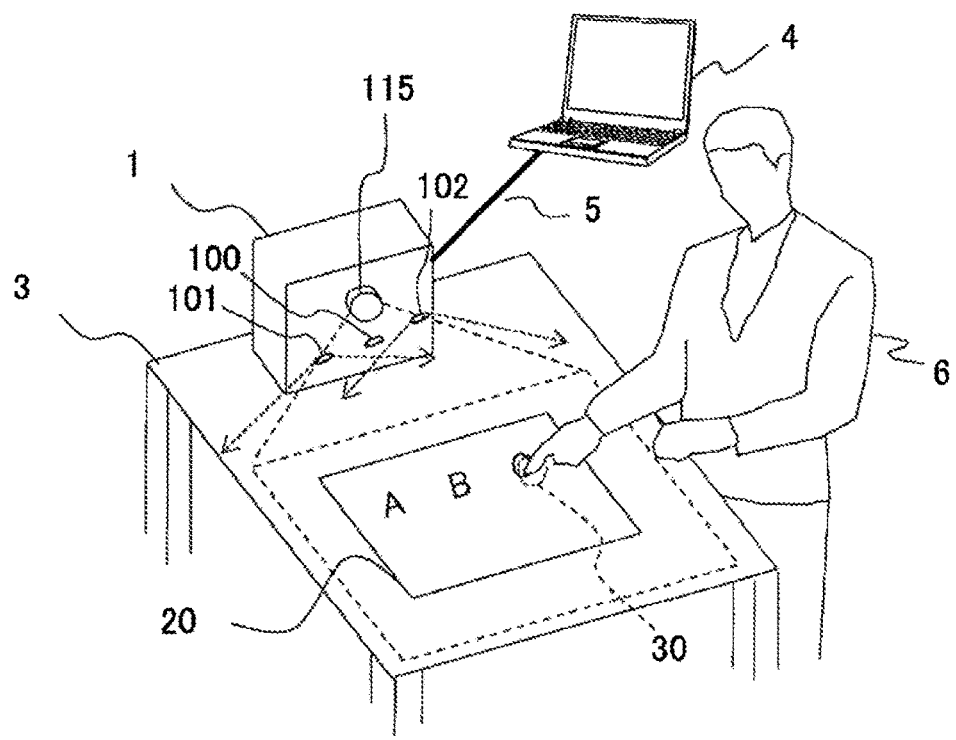
FIG. 1 illustrates how a projection video display device installed on a table projects video on, a top face of the table.

A first embodiment is a projection video display device in which a user controls a display screen by gesture input. First, by referring to FIGS. 1 and 2, an installation example of the projection video display device according to the present embodiment is described. FIG. 1 illustrates how a projection video display device 1 installed on a table projects video on the top face of the table. FIG. 2 illustrates an example of installing a projection video display device 1 on the wall and an example of operation by a user 6, in which (a) is a front view and (b) is a side view.

As illustrated in FIG. 1, when the projection video display device 1 is installed on the table, there is basically no need to adjust the position of the projection video display device when the table is moved. A display screen 20 is a partial image in a maximum projection range 2 of the projection video display device 1 projected to the top face 3 (which corresponds to a projection surface) of the table. A user 6 carries out a desired operation by allowing his/her finger 30, which acts as an operation object, to approach the projection surface 3 and letting the finger 30 touch a certain location. The user 6 executes the approaching and touching operation on the projection surface 3 in order to execute operations, such as writing a unique character string in, for example, display content or marking an important point of the display content. Operations by the user 6 and an operation detection method will be described later.

The projection video display device 1 includes, on the front side, a camera 100, a right illumination unit 101, a left illumination unit 102, and a projection unit 115 that projects an image on a video projection surface. The right illumination unit 101 and the left illumination unit 102 illuminate an operation object, such as a hand of the user or a pointer, with visible light or non-visible light (e.g., infrared light). The camera 100 picks up an image of a shadow formed on the video projection surface when irradiation light from the right illumination unit 101 and the left illumination unit 102 irradiates the operation object, such as a hand of the user or a pointer. The camera 100 then outputs a shadow image. Thus, the camera 100 corresponds to an image pickup unit. By projecting the light alternately from the right illumination unit 101 and the left illumination unit 102, and correspondingly outputting the shadow image from the camera 100, right and left images formed by picking up a shadow on the right and left, respectively, of the operation object, when facing the body of the operation object, are output alternately. Alternatively, the camera 100 may pick up an image of the projection surface while the right and left illumination units 101 and 102 are simultaneously illuminating, and output the shadow image by picking up the shadow formed on the left and right of the operation object.

For these shadow images, proximity to the video projection surface, a contact point, and a finger-pointing direction of the operation object are detected, of which details will be described later. Since the projection video display device 1 is installed on the table, it is less likely to interrupt light emitted from the projection unit 115 when the right illumination unit 101 and the left illumination unit 102 irradiate the operation object.

A maximum range of projection (hereinafter referred to as maximum projection range) 2 of the projection video display device 1 in which images (including moving images and still images) can optically be projected from the projection unit 115 is indicated by a region surrounded by a broken line in FIG. 1. A region where the projection video display device 1 actually projects video (hereinafter referred to as a display screen) within the maximum projection range 2 is a display screen 20. The display screen 20 corresponds to a screen of an on-screen display (OSD) which will be described later. Namely, the image displayed on the display screen 20 is a partial image within the maximum projection range 2.

For example, the following use is possible: persons who are present around the table can see a blueprint of a device displayed on the entire range of the maximum projection range 2, and the explanatory material of the blueprint is displayed on the display screen 20.

The projection video display device 1 is connected by communication to a video output device 4 (which corresponds to an external information processing device) via a video transmission cable 5 to allow data on the display screen 20 to be transmitted from the video output device 4. The video output device 4 may be implemented by a typical personal computer, a tablet device, or a video camera. As a modification example, another usage example is also possible in that the projection video display device includes a data processing unit and a portable storage device is connected to the projection video display device 1 to allow projection of data in the storage device.

Another example of the projection video display device 1 is that, as illustrated in FIG. 2(a), (b), the projection video display device 1 is fixed on the wall so that the projection surface 3 is provided as a vertical surface such as the wall surface of a building, instead of the horizontal surface such as the top face of the table. In this case, the user 6 is located immediately opposite to the projection surface 3.

Figure 3:
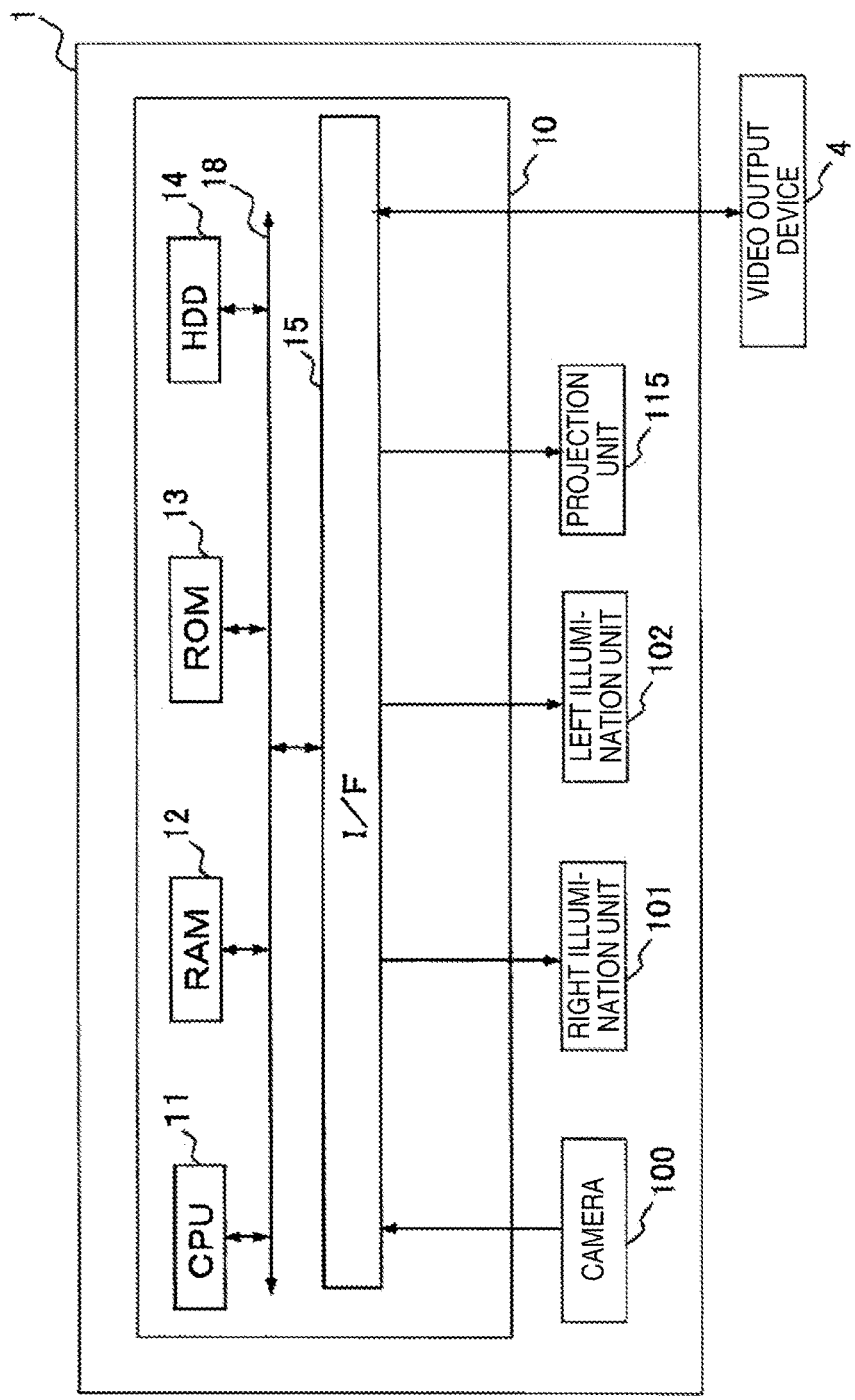
FIG. 3 is a block diagram illustrating hardware configuration of the projection video display device 1.
Figure 4:
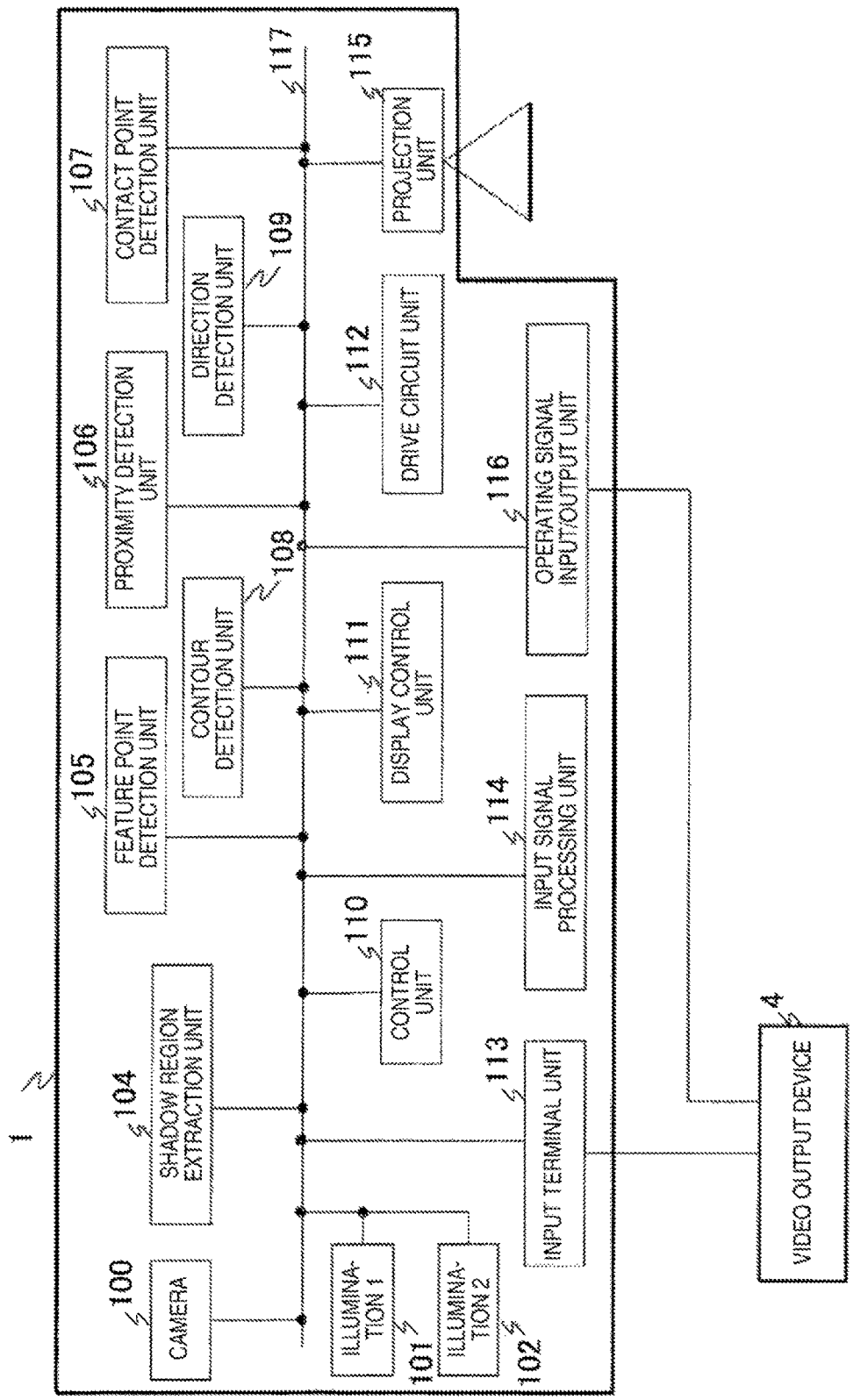
FIG. 4 is a block diagram illustrating an internal configuration the projection video display device 1.

A configuration of the projection video display device 1 is described by referring to FIGS. 3 and 4. FIG. 3 is a block diagram illustrating hardware configuration of the projection video display device 1. FIG. 4 is a block diagram illustrating an internal configuration of the projection video display device 1 according to the first embodiment.

As illustrated in FIG. 3, the projection video display device 1 includes a body unit 10, the camera 100, the right illumination unit 101, and the left illumination unit 102, and the projection unit 115. The body unit 10 includes a central processing unit (CPU) 11, a random access memory (RAM) 12, a read only memory (ROM) 13, a hard disk drive (HDD) 14, an interface (I/F) 15, and a bus 18. The CPU11, the RAM12, the R0M13, the HDD14 and the I/F 15 are connected to one another via the bus 18.

The body unit 10 is connected to the camera 100, the right illumination unit 101, the left illumination unit 102, and the projection unit 115 via the I/F 15 to form the projection video display device 1. Further, the video output device 4 is connected to the I/F 15 of the projection video display device 1. A video signal output from the video output device 4 is loaded to the RAM 12 via the video transmission cable 5 and the I/F 15 and projected to the display screen 20 from the projection unit 115.

Referring to FIG. 4, a functional configuration of the projection video display device 1 is described. The projection video display device 1 includes the camera 100, the right illumination unit 101, the left illumination unit 102, a shadow region extraction unit 104, a feature point detection unit 105, a proximity detection unit 106, a contact point detection unit 107, a contour detection unit 108, a direction detection unit 109, a control unit 110, a display control unit 111, a drive circuit unit 112, an input terminal unit 113, an input signal processing unit 114, the projection unit 115, an operating signal input/output unit 116, and the data bus 117. The shadow region extraction unit 104, the feature point detection unit 105, the proximity detection unit 106, the contact point detection unit 107, the contour detection unit 108, the direction detection unit 109, the control unit 110, and the display control unit 111 are established when programs for realizing the individual functions are loaded to the RAM 12 and executed by the CPU 11.

In the above configuration, the shadow region extraction unit 104, the feature point detection unit 105, the proximity detection unit 106, the contact point detection unit 107, the contour detection unit 108, and the direction detection unit 109 are operated together to detect, in accordance with the picked-up image by the camera 100, the state of the operation object that executes an action for input operation to the video output device 4. Therefore, the shadow region extraction unit 104, the feature point detection unit 105, the proximity detection unit 106, the contact point detection unit 107, the contour detection unit 108, and the direction detection unit 109 are collectively referred to as a detection unit.

The control unit 110 corresponds to an operating instruction information generation unit that generates operating instruction information indicating the content of the input operation in accordance with the state (including movement and attribute) of the operation object detected by the detection unit.

The input terminal unit 113 and the operating signal input/output unit 116 correspond to a communication unit that establishes communication connection with the video output device.

The camera 100 includes an image sensor and a lens to pick up left and right images including the finger 30 of the user 6 as the operation object.

The right illumination unit 101 and the left illumination unit 102 each include a light emitting diode, a circuit substrate, and a lens to irradiate the projection surface 3 and the finger 30 of the user 6 with illumination light to project shadows of the finger 30 in the image picked up by the camera 100.

The right illumination unit 101 and the left illumination unit 102 may use infrared light illumination, and the camera 100 may use an infrared light camera. Thus, the infrared light image picked up by the camera 100 can be acquired separately from visible light video which is the video of video signals projected from the projection video display device 1. Since the illumination light and the light for image pickup is any visible light rays that can be separated from the projection video from the projection video display device 1, ultra violet light can be used in place of the infrared light.

The shadow region extraction unit 104 extracts a shadow region from each of the right and left images obtained by the camera 100 to generate a shadow image. For example, a background image of the projection surface 3 that has previously been picked up is subtracted, from each of the right and left images to generate a difference image. Subsequently, the luminance of the difference image is binarized with a predetermined threshold Lth to determine a region having the luminance not more than the threshold as a shadow region. Further, processing which is so-called labeling processing is carried out to discriminate between shadow regions that are not connected with each other, among extracted shadows, as different shadows. By the labeling processing, it is possible to identify which finger the extracted plural shadows correspond to, that is, to identify two shadows that makes a pair corresponding to a single finger.

The feature point detection unit 105 detects a specific position (hereinafter referred to as a feature point) in the shadow image extracted by the shadow region extraction unit 104. For example, a tip end position (which corresponds to a fingertip position) in the shadow image is detected as a feature point. Various methods can be used to detect feature points. When the feature point is at the tip end position, the position can be detected from coordinate data of pixels constituting the shadow image. Alternatively, a portion matching the unique shape of the feature point may be detected by, for example, image recognition. Since one feature point is detected from one shadow, two feature points are detected for one finger (two shadows).

The proximity detection unit 106 measures a distance d (see FIG. 8) between two feature points detected by the feature point detection unit 105, and detects a gap s (proximity A) between the finger and the operating surface in accordance with the distance d. Thus, it is determined whether the finger is touching the operating surface.

When the proximity detection unit 106 has determined that the finger is touching the operating surface, the contact point detection unit 107 detects the contact point of the finger on the operating surface in accordance with the position of the feature point and calculates the coordinates of the contact point.

The contour detection unit 108 extracts the contour of the shadow region form the shadow image extracted by the shadow region extraction unit 104. For example, the interior of the shadow image is scanned in a fixed direction to determine a start pixel for tracing the contour, and pixels near the start pixel are traced anticlockwise to obtain the contour.

The direction detection tint 109 extracts a substantially linear segment from the contour line detected by the contour detection unit 108. A finger-pointing direction of the finger on the operating surface is detected in accordance with the direction of the extracted contour line.

The processing of individual detection units is not limited to the, method described above, and other image processing algorithm may be used. The detection units may not be formed using hardware based on the circuit substrate, but software may also be used.

The control unit 110 controls the entire operation of the projection video display device 1, controls data transmission/reception appropriately between individual units via the data bus 117, and generates detection result data, such as the proximity of fingers relative to the operating surface, the coordinates of the contact point, and the finger-pointing direction, which are detected by individual detection units.

The display control unit 111 generates display control data, such as an operation mode and a position and a direction of the pointer, in accordance with the detection result data including the proximity of fingers, the coordinates of the contact point, and the finger-pointing direction generated by the control unit 110. The display control unit 111 then carries out processing in accordance with the display control data on the video signal transmitted through the input terminal unit 113 and the input signal processing unit 114.

The drive circuit unit 112 carries out processing of projecting the processed video signal as the display video image. The display image is projected from the projection unit 115 to the projection surface.

The individual units described heretofore are provided as examples installed on the projection video display device 1. Alternatively, part of these units may be formed as a separate unit and connected via a transmission line.

The input terminal unit 113 receives an input of the video signal from the external video output device 4 and transmits data to the input signal processing unit 114. The video output device 4 needs to be connected to allow transmission of video, and a VGA or DVI terminal and a network cable, for example, can be used. Although a single video output device is connected in the present embodiment, a plurality of terminals may be provided to allow connection with a plurality of video output devices.

The operating signal input/output unit 116 is connected to the external video output device 4 to transmit data, such as the coordinate of the contact point, which is generated from the gesture operation of the user 6 to the external video output device 4. Among these data, data for allowing pointer operation input in the video output device 4 in accordance with the movement of the finger 30 (operation object) of the user 6 is referred to as first control information. The first control information includes, for example, information indicating whether the operation object is in a contact state or a non-contact state with the projection surface, information indicating the moving direction, or coordinate information of the contact point, if the operation object is in the contact state.

Meanwhile, data for allowing a predetermined key input in the video output device 4 in accordance with attribute of the finger 30 (operation object) of the user 6 is referred to as second control information. The second control information includes, for example, information indicating discrimination between right hand and left hand of the user, types of the fingers, or information indicating whether the palm side or the back side of the hand faces the camera 100.

In a case where the video output device 4 is, for example, a so-called personal computer capable of executing image processing, the video output device 4, instead of the projection video display device, may be configured to execute a series of steps of processing of generating the first or second control information according to the picked-up image by the camera 100. The picked-up image and the first and second control information may be in the data format defined for the video output device 4, or in unique data format previously defined by installing software, for example, corresponding to the communication system in the video output device 4.

The data bus 117 is a connection line for transmitting various types of data. Naturally, the aforementioned example is not given in a limiting manner, and the example can be appropriately changed so that, for example, the individual units are directly connected with each other.

Figure 5:
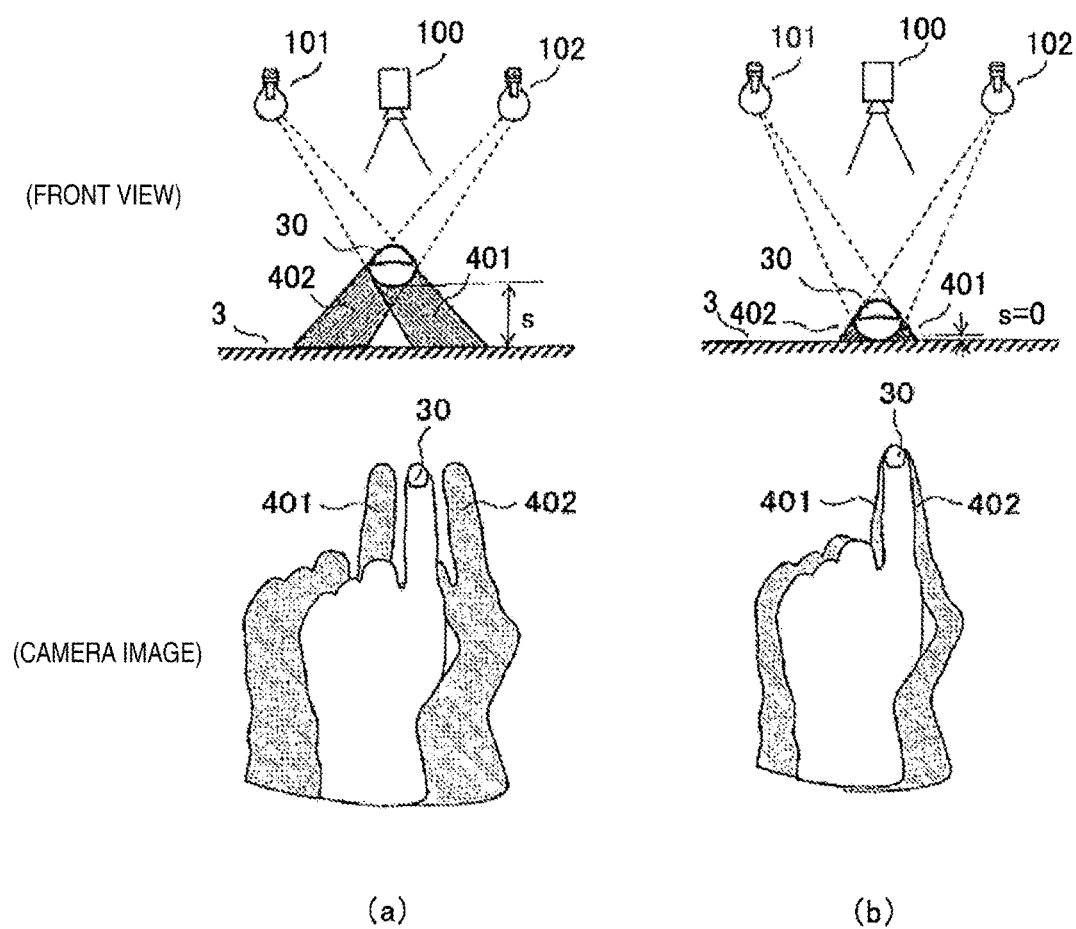
FIG. 5 illustrates an example of the shape of a shadow image of a user, in which (a) is a shadow image when a finger of the user does not touch the projection surface, and (b) is a shadow image when a finger of the user touches the projection surface.

Referring to FIG. 5, an example of operating the projection video display device 1 using a finger of the user is described. FIG. 5 illustrates an example of the shape of the shadow image of a user, in which (a) is a shadow image when a finger of the user does not touch the projection surface, and (b) is a shadow image when a finger of the user touches the projection surface.

As illustrated in FIG. 5(a), when the finger 30 does not touch the projection surface 3 (gap s), the light from the right and left illumination units 101 and 102 are interrupted by the finger 30, so that shadow regions 401, 402 (indicated with hatched lines) are formed. In the camera image, two shadow regions 401, 402 are provided separately from each other on both sides of the finger 30.

Meanwhile, when the fingertip of the finger 30 touches the projection surface 3 (gap s=0), as illustrated in FIG. 5(b), the two shadow regions 401, 402 are provided in close proximity with the fingertip of the finger 30. Although the shadow regions 401, 402 are partially hidden behind the finger 30, such hidden part is not included in the shadow region. In the present embodiment, the contact between the finger 30 and the operating surface (projection surface 3) is determined using the characteristic that the distance between the shadow regions 401, 402 (in particular, the distance between feature points) becomes closer when the finger 30 approaches the projection surface 3.

Figure 6:
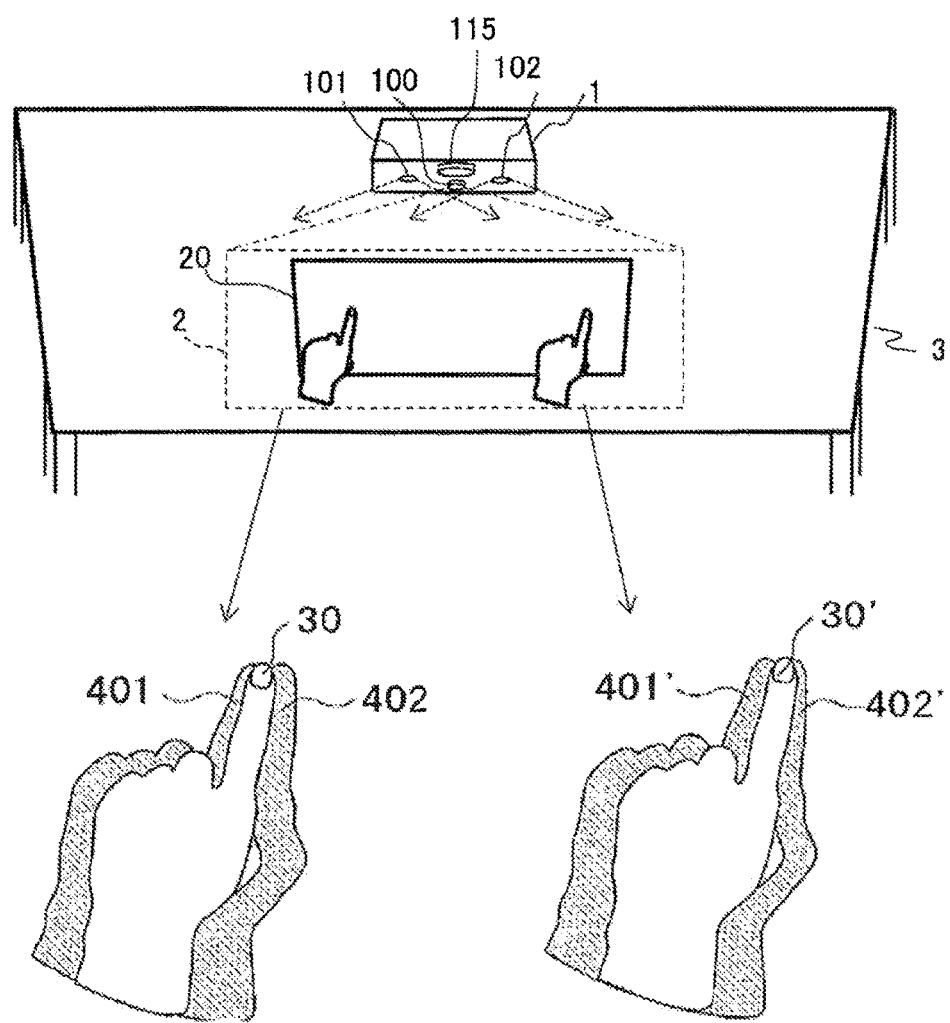
FIG. 6 illustrates how the operation position of the user affects the shape of the shadow.

FIG. 6 illustrates how the operation position of the user affects the shape of the shadow Camera images each picked up when the operation position of the user is herein deviated from the center of the projection surface 3 to the left (the finger 30 of the user is at a position 30p) or to the right (the finger 30 of the user is at a position 30p') are compared. At this time, the operation position of the user seen from the camera 100 changes, but in the camera images, the positional relationship between the shadow regions 401 (401'), 402 (402') relative to the finger 30 (30') does not change. Namely, the shadow regions 401 (401'), 402 (402') are constantly provided on both sides of the finger 30 (30') irrespective of the operation position of the user. This is determined unambiguously from the positional relationship between the camera 100 and the right and left illumination units 101 and 102. Therefore, the two shadow regions 401, 402 can be detected constantly regardless of where the user operates the projection surface 3, so that the operation detection method of the present embodiment can be applied effectively.

Figure 7:
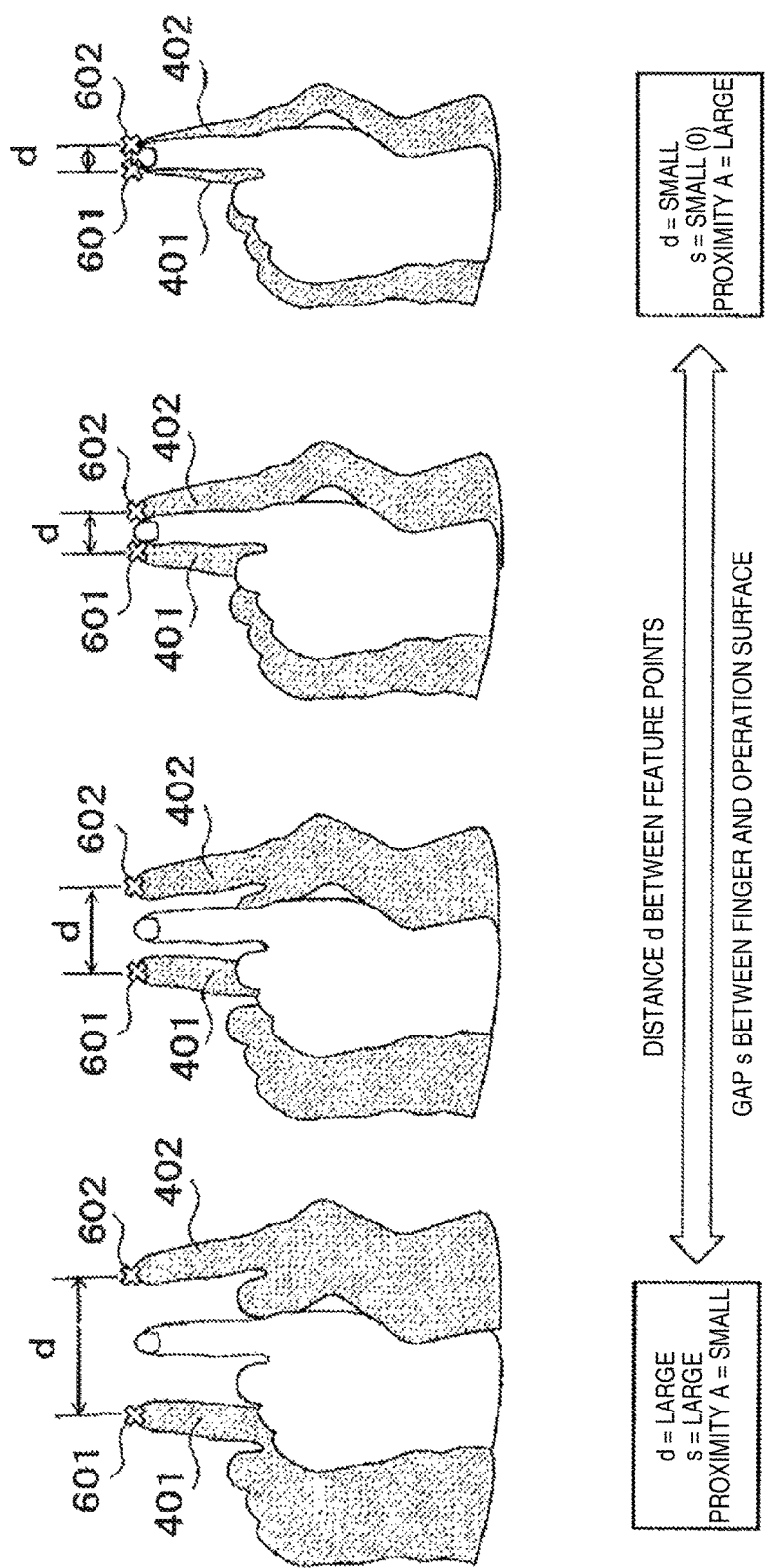
FIG. 7 illustrates gaps between a finger and an operating surface relative to the shape of the shadow.

FIG. 7 illustrates gaps between the finger and the operating surface relative to the shape of the shadow. The distance between the two shadow regions 401, 402 formed on both sides of the finger 30 changes in accordance with the gap s (see FIG. 6) between the finger 30 and the projection surface 3. To define the distance between the two shadow regions 401, 402, feature points 601, 602 (indicated by mark x) are set in the individual shadow regions 401, 402 to measure the distance d between the feature points. The feature points are herein set on the tip end position (fingertip position) of the shadows. When the gap s between the finger 30 and the projection surface 3 is large, both the distance between the two shadow regions 401, 402 and the distance d between the two feature points 601, 602 are large. As the finger 30 approaches the projection surface 3, the distance d between the feature points 601, 602 decreases. When the finger 30 touches the projection surface 3 (gap s=0), the distance d between the feature points 601, 602 is at the minimum value.

Figure 8:
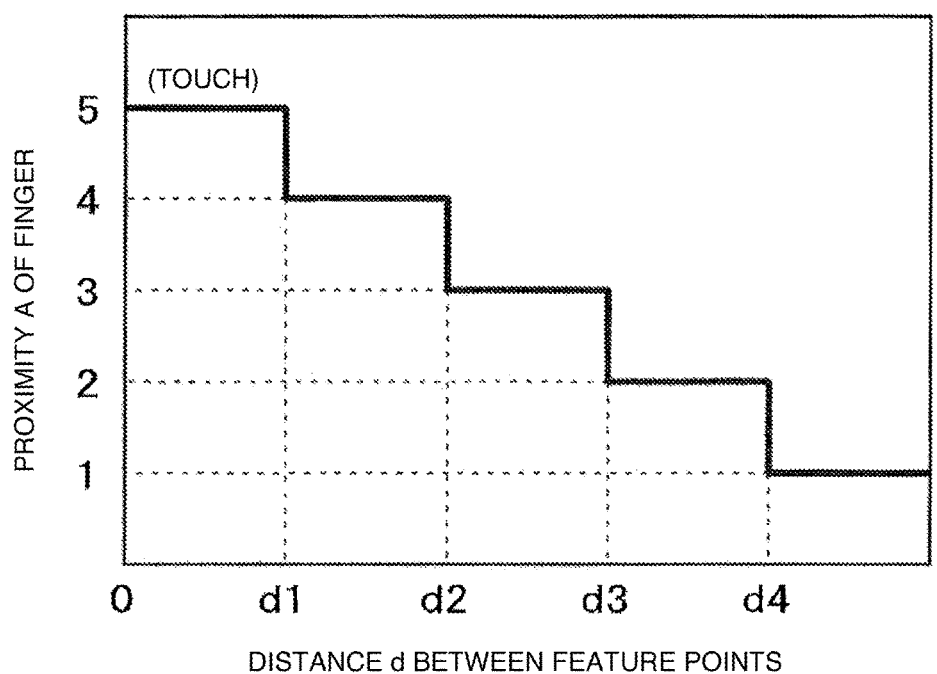
FIG. 8 is an explanatory view for explaining determination of proximity according to feature points.

FIG. 8 is an explanatory view for explaining determination of proximity according to feature points in the proximity detection unit 106. The proximity detection unit 106 herein determines proximity A in accordance with the distance d between the feature points. To determine the proximity A, information (or a function) for setting four threshold values d1, d2, d3, d4 (where d1<d2<d3<d4) of the distance d between the feature points is previously stored in the ROM 13 or the HDD 14. The proximity detection unit 106 determines proximity by referring to the distance d between the feature points and the above information. Accordingly, the proximity A is classified into five levels (levels 1 to 5), with the value of the level increasing as the gap s between the finger 30 and the projection surface 3 decreases. First, a threshold d1 is determined to identify the contact state (gap s=0) in which the finger 30 touches the projection surface 3. If the distance d<d1, it is determined that the proximity A is at the maximum level 5 (contact state). Otherwise, in non-contact states, the proximity A is classified in four levels (levels 4 to 1) using the thresholds d2 to d4. If d>d4, the proximity A is determined to be at the lowest level 1. Although the proximity is classified into five levels in this example according to the four threshold values, the number of classifications of the proximity is not limited to this and may be appropriately set in accordance with content of the control. Further, the distance d between the feature points and the proximity A are correlated in a stepped manner in FIG. 8, but may also be correlated linearly.

Figure 9:
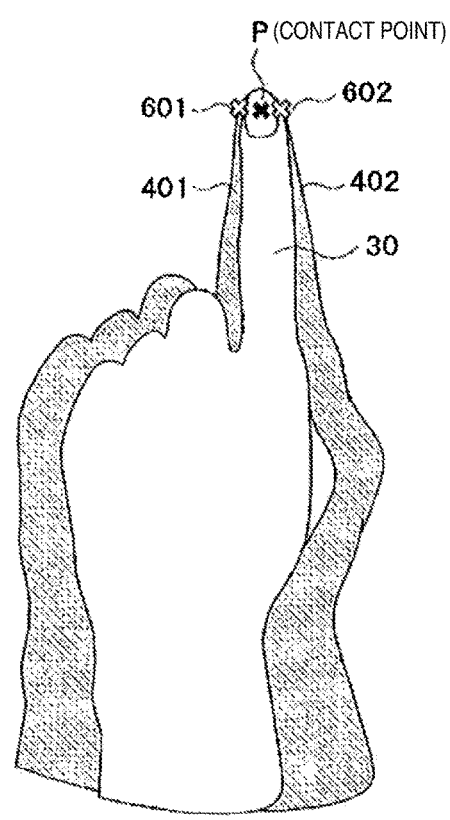
FIG. 9 is an explanatory view for explaining determination of a paint according to feature points.

FIG. 9 is an explanatory view for explaining determination of a contact point in the contact point detection unit 107. The shape of the shadow regions 401, 402 is illustrated when the finger 30 touches the projection surface 3, with the feature points 601, 602 being set herein at the tip end positions of the shadow regions 401, 402, respectively. In this case, the two feature points 601, 602 are near the fingertip position which is a contact point, so that a midpoint P between the two feature points 601, 602 can be regarded as the contact point of the finger 30 with the projection surface 3, and the coordinates of the midpoint are calculated.

Since the feature points 601, 602 are set at the tip end positions of the shadow regions 401, 402, respectively. In the above example, the feature points can be set easily by this method and the position of the contact point P can also be determined easily as it exists near the feature points.

Figure 10:
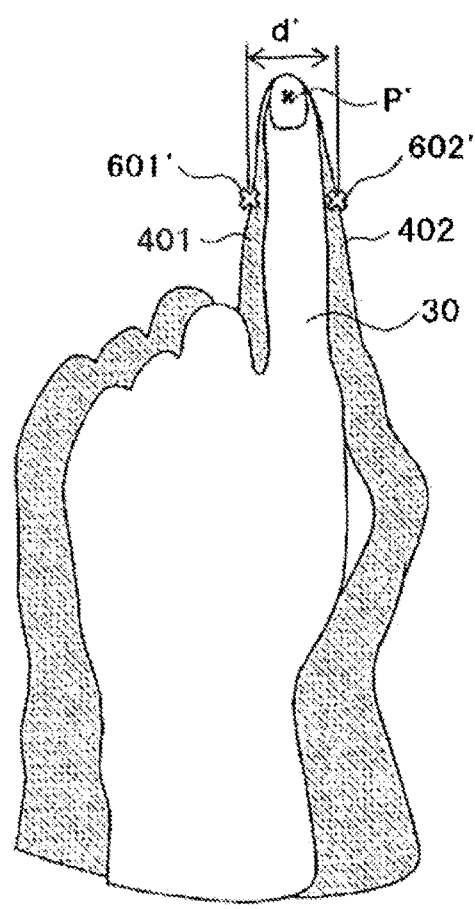
FIG. 10 illustrates a case where feature points are set at other positions.
Figure 11:
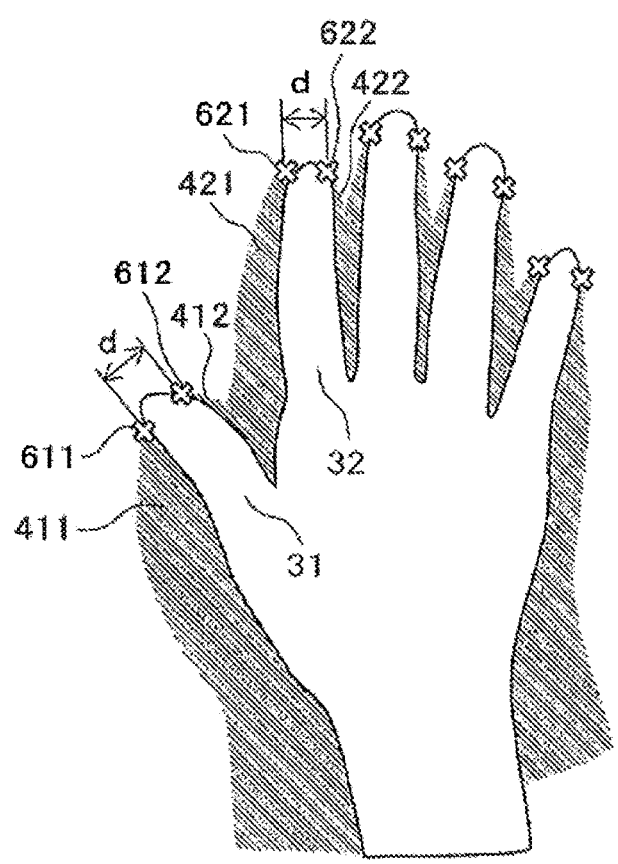
FIG. 11 illustrates the shape of the shadow when the operation is carried out with a plurality of fingers.

FIG. 10 illustrates a case where the feature points are set at other positions. Although the feature points 601, 602 are set at the tip end positions of the shadow regions 401, 402 in FIG. 9, the feature points 601', 602' are set at the middle point in the longitudinal direction of each shadow in FIG. 10. Since the distance d' between the feature points 601' and 602' also changes in accordance with the change of the distance between the shadow regions 401, 402, the proximity A between the finger 30 and the projection surface 3 can be determined. In this case, the contact point P' is deviated longitudinally from the feature points 601', 602'. Therefore, a distance (correction amount) between the feature points 601', 602' and an expected contact point P' is previously determined so that the contact point P' can be determined by correcting with the correction amount. Similarly, the feature points can be set to other position of the shadow regions 401, 402. Further, information of a plurality of feature points can also be used, FIG. 11 illustrates the shape of the shadow when the operation is carried out with plural fingers. When the hand is opened and a plurality of fingers 31, 32, . . . are brought to touch the operating surface, left shadows 411, 421, . . . and right shadows 412, 422, . . . are formed for individual fingers. Feature points are then set for each shadow. Feature points 611, 612 for shadows 411, 412 and feature points 621, 622 for shadows 421, 422 are illustrated herein. A distance d between corresponding feature points 611, 612 or 621, 622 is measured to determine the proximity or the contact points of the fingers 31, 32. Thus, according to the present embodiment, the touch of the fingers can be detected for a plurality of fingers even when the hand is opened, and the present embodiment can be applied to multi-touch operations. Other examples of the feature points are knuckles of fingers (whose images are picked up as projections) or depressed portions of knuckles (whose images are picked up as recesses).

Figure 12:
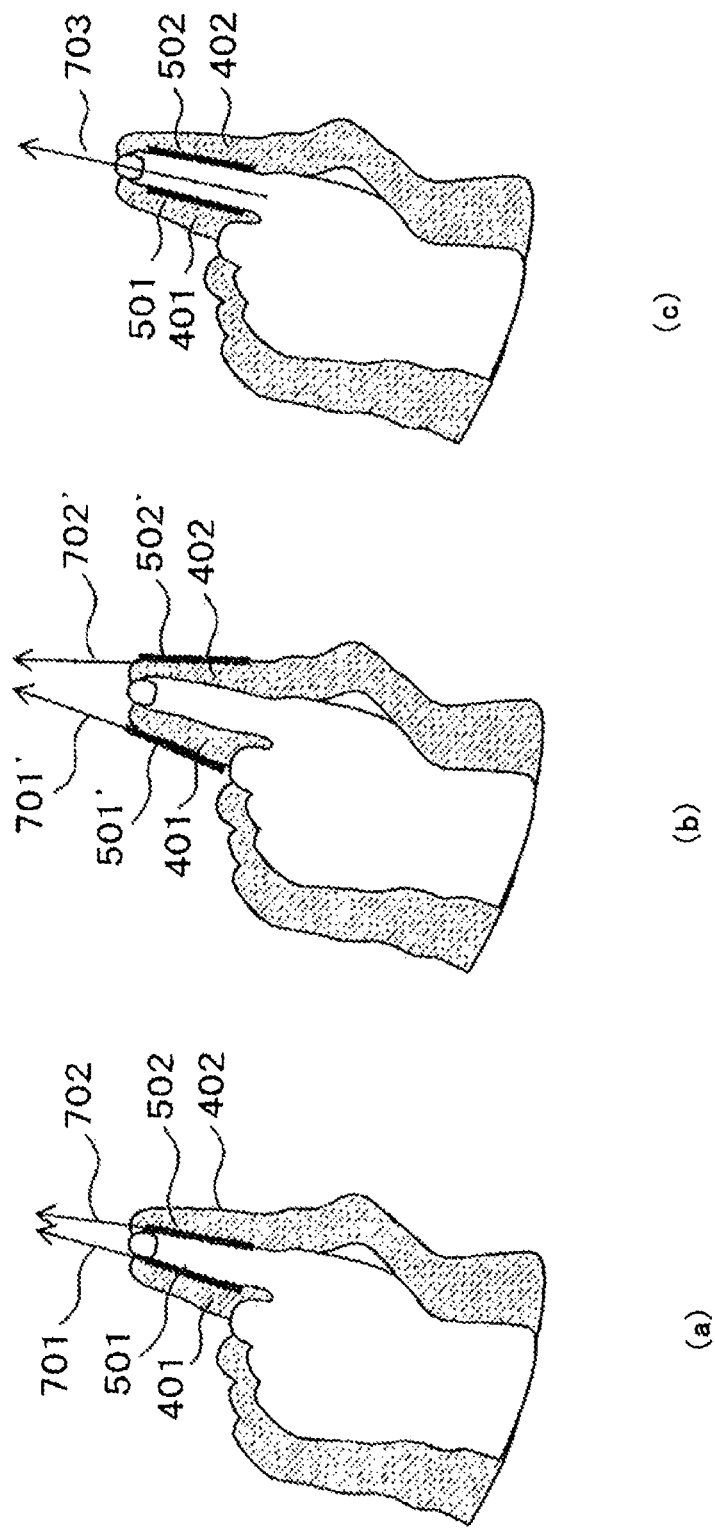
FIG. 12 illustrates processing of calculating a finger-pointing direction which (a) is an example of using inner contour lines of the shadow image, (b) is an example of using outer contour lines of the shadow image, and (c) is an example of using a middle line of contour lines.

Next, by referring to FIG. 12, processing of calculating a direction (hereinafter referred to as a finger-pointing direction") pointed by a finger acting as the operation object is described. FIG. 12 illustrates processing of calculating a finger-pointing direction in which (a) is an example of using >inner contour lines of the shadow image, (b) is an example of using outer contour lines of the shadow image, and (c) is an example of using a middle line of contour lines.

The shape of the shadow regions 401, 402 formed when the direction of the finger 30 (finger-pointing direction) is tilted. As the finger-pointing direction changes, the direction of the shadow regions 401, 402 change accordingly. To detect the finger-pointing direction, the contour detection unit 108 first detects the contour lines 501, 502 for the shadow regions 401, 402. In detecting the contour lines, substantially linear line segments when curved portions such as fingertip portions are detected as the contour lines. The direction detection unit 109 then determines the finger-pointing direction by the following method.

In FIG. 12(a), the direction detection unit 109 uses inner contour lines 501, 502 of the shadow regions 401, 402. The direction detection unit 109 then determines a tilt direction 701 or 702 of the inner contour lines 501, 502, respectively, as the finger-pointing direction.

In FIG. 12(b), the direction detection unit 109 uses outer contour lines 501', 502' of the shadow regions 401, 402. The direction detection unit 109 then determines a tilt direction 701' or 702' of the outer contour lines 501', 502', respectively, as the finger-pointing direction.

In FIG. 12(c), the direction detection unit 109 uses the inner contour lines 501, 502 of the shadow regions 401, 402. The direction detection unit 109 then determines a tilt direction 703 of the middle line of the inner contour lines 501, 502 as the finger-pointing direction. In this case, the determination is more accurate, as an average direction of the two contour lines 501, 502 is used. Alternatively, a midpoint direction of the outer contour lines 501', 502' may be used as the finger-pointing direction.

Figure 13:
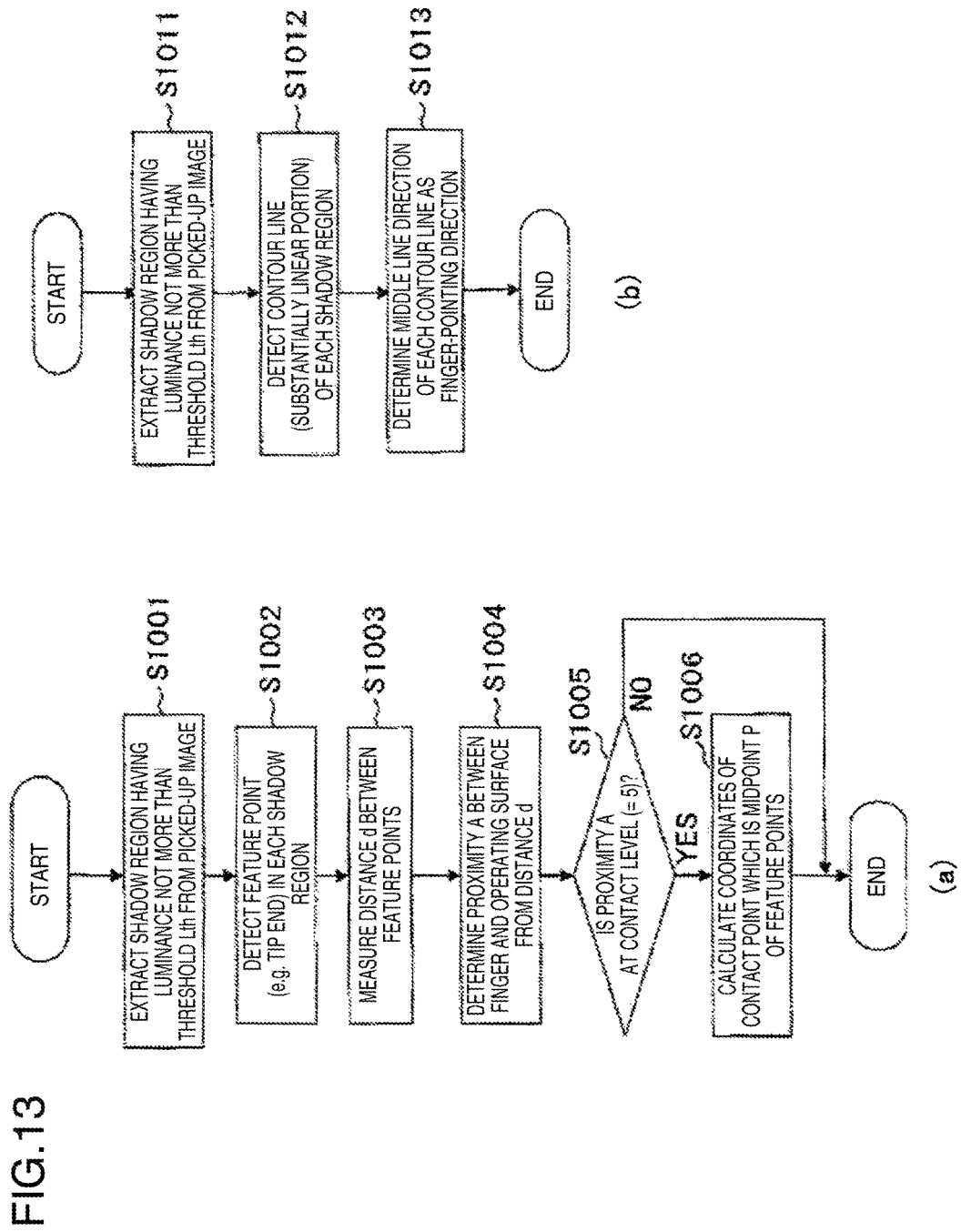
FIG. 13 is a flowchart illustrating the process flow of an operation detection method according to a first embodiment, in which (a) illustrates detection processing for the proximity and the contact point and (b) illustrates detection processing for a finger-pointing direction.

Referring to FIG. 13, an operation detection method according to the first embodiment is described. FIG. 13 is a flowchart illustrating the process flow of an operation detection method according to the first embodiment, in which (a) illustrates detection processing for the proximity and the contact point and (b) illustrates detection processing for the finger-pointing direction.

First, the detection method of the proximity and the contact point is described following the steps illustrated in FIG. 13(a).

In S1001, the shadow region extraction unit 104 subtracts background from the image picked up by the camera 100 to determine a difference image, and, extracts a portion having the luminance not more than the threshold Lth as a shadow region (S1001). At this time, the processing which is so-called labeling processing is carried out to discriminate between shadow regions that are not connected with each other, among extracted shadows, as different shadows.

In S1002, the feature point detection unit 105 detects feature points of each shadow image to which the labeling processing has been carried out (S1002). For example, as illustrated in FIG. 9, the tip end positions of the shadow regions 401, 402 are detected as the feature points 601, 602.

In S1003, the distanced between the two feature points 601, 602 detected by the proximity detection unit 106 is measured (S1003).

In S1004, the proximity detection unit 106 determines the proximity A between the finger 30 and the projection surface 3 in accordance with the distanced (S1004). In the determination, by referring to FIG. 8, for example, the distance d is compared with the threshold values d1 to d4 to classify the proximity A into the levels 1 to 5. When d<d1, it is determined that the proximity A=5 (contact state).

In S1005, the proximity detection unit 106 determines whether the determined proximity A is the contact level (=5) (S1005). If the determination result is the proximity A=5 (S1005/Yes), the proximity detection unit 106 outputs information indicating the determined proximity thereinafter referred to as "proximity information") to the contact point detection unit 107, and the process proceeds to S1006. Otherwise (in the non-contact state), the process ends (S1005/No).

In S1006, the contact point detection unit 107 detects the contact point between the finger 30 and the projection surface 3 (S1006). For example, as illustrated in FIG. 9, the midpoint P between the two feature points 601, 602 is determined as the contact point, and the coordinate of the midpoint P is calculated. If the feature points are set differently from the above-mentioned method (in the case of the tip end positions), the positions of the contact points need to be corrected according to the setting method. The operation object information of the detected proximity and the contact, point are output to the display control unit 111.

In the operation state, the process flow described above is executed repeatedly to detect operation following the change of the operation state.

In order of the steps illustrated in FIG. 13(b), the detection method for the finger pointing direction is described.

In S1011, the shadow region extraction unit 104 subtracts background from t the image picked up by the camera 100 to determine a difference image, and extracts a portion having the luminance not more than the threshold Lth as a shadow region (S1011). The same can apply to S1001 described above.

In S1012, the contour detection unit 108 detects the contour lines (substantially linear portions) of each shadow region to which the labeling processing has been carried out (S1012). For example, as illustrated in FIG. 12(c), the inner contour lines 501, 502 of the shadow regions 401, 402 are detected. At this time, the curved portions, such as the fingertip, are removed from the contour lines to detect the substantially linear line segments.

In S1013, the direction detection unit 109 determines the tilt direction 703 of the middle line of the contour lines 501, 502 as the finger-pointing direction. The finger-pointing direction may be determined by the methods illustrated in FIG. 12(a) or 12(b).

In the operation state, the process flow described above is executed repeatedly to detect operation following the change of the operation state.

The detection processing for the proximity and the contact point of FIG. 13(a) can be carried out in parallel with the detection processing for the finger-pointing direction of FIG. 13(b).

FIG. 14 illustrates a control example according to the proximity of fingers in the display control unit 111. Display control information including the proximity, switching of the operation mode, and switching of the pointer display, which are correlated with one another, is previously stored in the ROM 13 or the HDD 14 of the projection video display device 1. The display control unit 111 then obtains the operation object information and, by referring to the display control information, switches the operation mode of the operation object and the point display.

FIG. 14 illustrates switching the operation mode and the pointer display in accordance with the proximity A between the finger 30 and the projection surface 3. So far as the operation mode is concerned, the touch operation mode is set when the proximity A is at the highest level 5 (contact state). For other non-contact states, the operation mode is switched to an aerial operation mode when the proximity A is relatively high at the level 4 or 3, and the operation mode is switched to an operation-off mode when the proximity A is at the relatively low level 2 or 1. By such a control, the user 6 is able to operate a target device to be operated not only when the finger 30 touches the projection surface 3, but also when the finger 30 is in a floating state above the projection surface 3. If the finger 30 is away from the projection surface 3 by more than a fixed distance, the operation mode is switched to the operation-off mode to prevent undesired operation by the user.

For the pointer display, the pointer is displayed when the proximity A is at the relatively high level 5 or 4, and the pointer is not displayed when the proximity A is at the relatively low level 3, 2, or 1. By such a control, the user 6 is able to check the pointer before the finger 30 touches the projection surface 3, and can easily align the pointer in the contact state. The above-described method improves operability of the target device to be operated.

FIG. 15 illustrates a control example according to the finger-pointing direction in the display control unit 111, in which (a) illustrates correction of the pointer display position, (b) illustrates correction of the pointer display direction, and (c) illustrates correction of the contact point.

FIG. 15(a) illustrates processing of correcting the display position of a pointer 800 in accordance with a finger-pointing direction 700. In displaying the pointer 800, if the pointer 800 is displayed at an exactly the same position as a contact point P detected by the contact point detection unit 107, the pointer 800 would be hidden by the finger 30 and would not be seen from the user 6. Therefore, the pointer 800 is displayed at a position P' which is displaced to the front of the finger by a predetermined distance in the finger-pointing direction 700 detected by the direction detection unit 109. Thus, the pointer 800 can be seen more easily from the user 6.

In addition, a shifting amount (correction amount) of the pointer 800 may be changed in accordance with the proximity A of the finger 30. For example, the correction amount increases when the proximity A is low, and the correction amount is decreased when the proximity A is high. Accordingly, the position of the pointer 800 approaches the fingertip as the finger 30 of the user 6 approaches the projection surface 3, so that the user 6 can operate more accurately using the display position of the pointer 800 as a guide.

FIG. 15(b) illustrates a case where the display direction of the pointer 800 is corrected in accordance with the finger-pointing direction 700. In displaying the arrow-shaped pointer 800, if, for example, the pointer 800 is constantly displayed in a fixed direction irrespective of the finger-pointing direction 700, as in FIG. 15(a), the display direction of the pointer 800 would not match the finger-pointing direction 700, causing the user 6 to have a strange feeling. Therefore, the display direction of the pointer 800 is displayed in a direction matching the finger-pointing direction 700 detected by the direction detection unit 109. This eliminates inconsistency with the finger-pointing direction 700, thus removing the strange feeling of the user 6.

FIG. 15(c) illustrates a case where the position of the contact point is corrected in accordance with the finger-pointing direction 700. The contact point P detected by the contact point detection unit 107 is determined from the positions of the feature points, so that the contact point P would sometimes be deviated from the actual position touching the projection surface 3. For example, if the feature points are at the tip end positions of the shadows, the feature points would be deviated toward the tip end side of the finger (or to the nail tip side) from the actual touching position (which is, in many cases, at the ball of the finger). Therefore, the position of the contact point is corrected toward the base of the finger by a predetermined amount (P→P") along the finger-pointing direction 700 detected by the direction detection unit 109. This allows the contact point between the finger 30 and the projection surface 3 to be obtained correctly.

The detection method for the operation content by the user 6 by detecting, for example, the finger pointing in the projection video display device 1 has been described above. In the detection method described above for detecting the contact point and the finger-pointing direction by the finger-pointing gesture, the operation is enabled so long as a long and thin object, such as a finger, is available. This method is significantly convenient compared to a method using a light emitting pen or the like that carries out recognition processing by emitting predetermined light from the tip of the pen, as there is no need to prepare such a light emitting pen or the like dedicated for the method.

For simplicity, the present embodiment described above includes two illumination lights, but the number of the illumination lights is not limited to this and three or more illumination lights may be provided, so that the shadow images generated from, for example, two or more illumination lights can be selectively used.

Meanwhile, the present embodiment has been described in the case where only one finger of the hand of the user 6 is projecting. When, however, a plurality of hands and fingers is projecting and with the proximity corresponding to the aerial operation mode, the pointer may not be displayed for any hand and finger, or may be displayed for all hands fingers.

Next, the screen operation carried out by the user 6 by the above-mentioned finger-pointing or the like is described. The screen operation includes, for example, the following five operations.

(1) Instruction Operation: A pointer or a particular mark for drawing attention is displayed near the finger-pointing point.

(2) Entry Operation: The contact point of the finger is used like the tip of the pen to draw characters and pictures by tracing over the projection surface 3. The drawing may be displayed only on the projection screen by the display control unit 111, or the coordinate information is transferred each time to the external video output device 4 to cause the video output device 4 to update the display screen.

(3) Delete Operation: Content of the entry is deleted. The deleting including, for example, erasing a portion near the contact point like using an eraser, deleting all entry content collectively, or deleting the entry by undo operation for each operation unit.

(4) Display Screen Operation: The way the displayed content is seen is changed. For example, the direction or size of the display screen 20 is changed.

(5) Display Content Operation: The operation content is transmitted to the external video output device 4 to change the displayed content, while maintaining the shape of the screen of the display screen 20 by, for example, switching slides, rotating a part of the display content, or changing the size of the display content.

Figure 16:
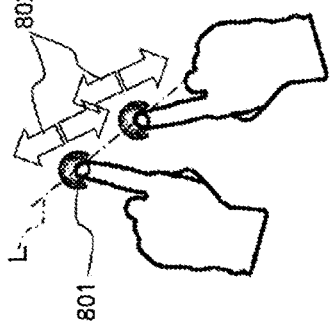
FIG. 16 illustrates a control example in response to a two-point simultaneous touch operation.
Figure 17:
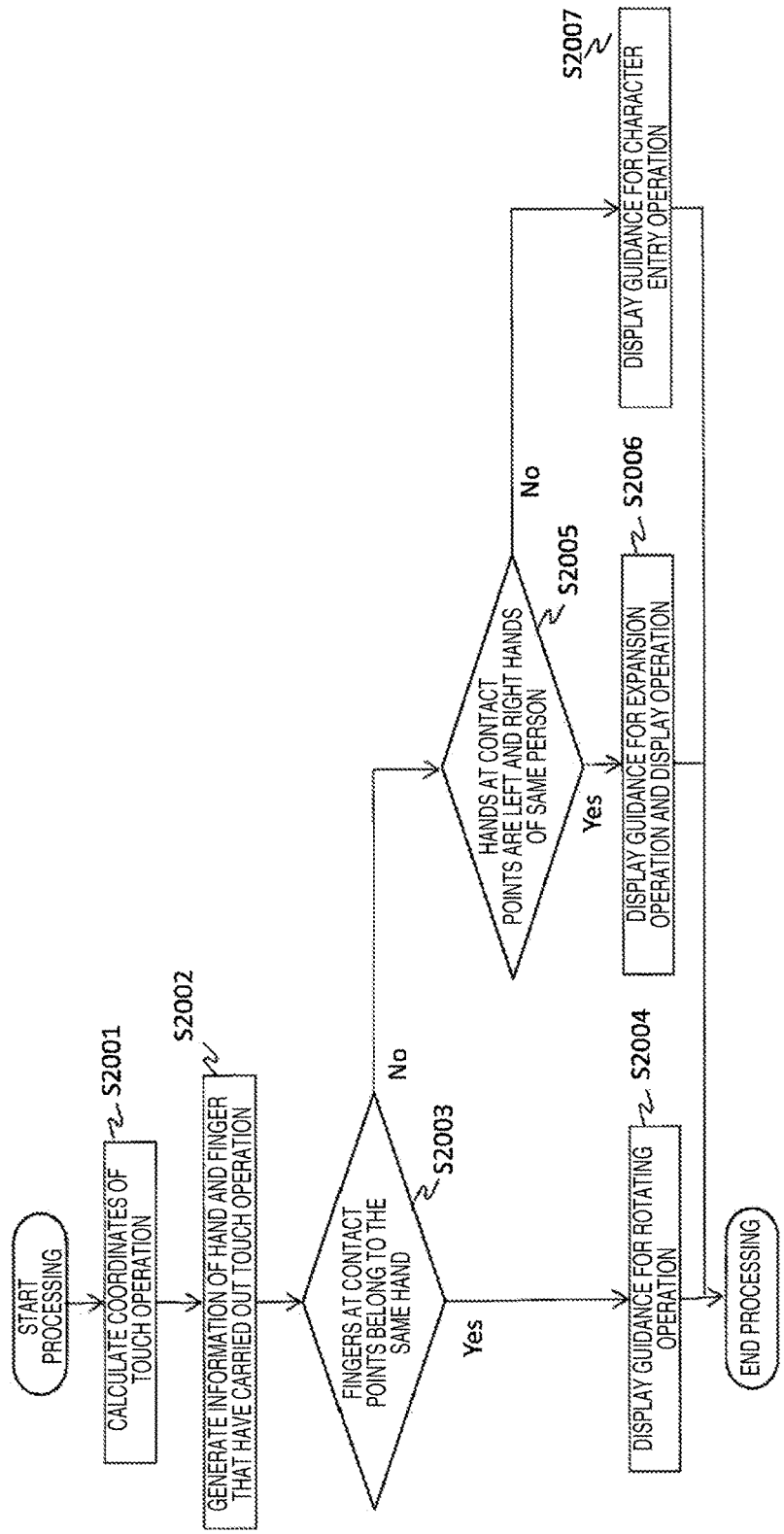
FIG. 17 is a flowchart illustrating the process flow of a determination method of a result of the two-point simultaneous operation.

Thus, when there are several kinds of executable operations, it is important to instantly respond to the user operation to improve usefulness. Referring to FIG. 17, therefore, an example user operation is described. FIG. 16 illustrates a control example in response to a two-point simultaneous touch operation.

(Zoom Operation Mode)

Zooming operation starts when the control unit 110 detects simultaneous touch of right and left hands and fingers of the user 6. The display control unit 111 presents a detection result by displaying marks 801 indicating reception of the touch operation at the coordinates at which the touch operation is executed, and then displaying arrow-shaped marks 802 in parallel with a straight line L connecting the two points, thus indicating that the display screen 20 of the expansion/reduction operation is possible (the zoom operation mode has started). After that, the display control unit 111 constantly controls the size of the display screen 20, until the user 6 cancels at least one contact, in the direction of the straight L connecting the two points in accordance with the detection result of the contact points.

In the above description, the term "simultaneous" in the "simultaneous operation" is used in such a manner that when the control unit 110 detects a plurality of contact points in single detection processing during the touch detection processing executed periodically by the control unit 110, such contacts can be determined to occur simultaneously. Alternatively, when the plurality of contacts is detected in several times in the detection processing and a time difference between the individual detection time of the contacts is within a predetermined time period, such operation can be determined to be a simultaneous operation. For example, the control unit 110 detects fingers, among plural fingers that have been detected by the camera 100, having a difference in contact time on the projection surface 3 within 1 second, and may determine such fingers as a combination of fingers to which the response processing is carried out. The meaning of the simultaneous operation is similarly applied to other operation modes described below.

When the same person executes the touch operation with both hands and fingers, but the touch timing is not simultaneous for left and right hands and fingers, the control unit 110 presents, for the touch operation that has been executed earlier, the mark 801 indicating reception of the touch operation at the contact coordinates and also presents a mark 804 representing a writing tool nearby to urge the user 6 to execute entry operation. Meanwhile, for the touch operation that has been executed later, the control unit 110 recognizes such a touch operation to be invalid in the entry operation mode, and displays no mark that indicates the reception of the touch, showing that no operation that can be responded is available, or displays a mark or a message nearby of the contact point to indicate that the touch operation is invalid. Alternatively, the control unit 110 determines both operations to be the entry operation, and the display control unit 111 presents the marks 801 indicating the reception at the coordinates of the contact point and displays the writing tool marks 804 nearby (indicating the entry operation mode has started) to urge the user 6 to execute entry operation. After that, the lines may be drawn following the loci of the contact points on the projection surface by the user 6.

(Rotating Operation Mode)

When the control unit 110 simultaneously detects the touch operation with different fingers of one hand of the user 6, a rotating operation mode starts. The display control unit 111 presents the detection result by displaying the, marks 801 indicating the reception a the touch operation at the coordinates at which the touch operation is executed, and nearby displays a mark 803 in the shape of a rotating arrow, indicating that the rotating operation of the display screen 20 is available (the rotating operation mode has entered). After that, the display control unit 111 constantly controls the direction of the display screen 20, until the user 6 cancels at least one touch, in accordance with the change amount of the line segment connecting the two points from the detection result of the contact points.

If the operation of the two points is not carried out simultaneously, the mark 801 indicating the reception of the touch operation may be presented at the contact coordinates for the touch operation that has been executed earlier, and the mark 804 representing a writing tool is displayed nearby to urge the user 6 to execute entry operation. For the touch operation that has been executed later, the control unit 110 recognizes such a touch operation to be invalid in the entry operation mode, and displays no mark that indicates the reception of the touch, showing that no operation that can be responded is available.

(Entry Operation Mode)

When the control unit 110 detects that different users have executed the simultaneous touch operations, the display control unit 111 presents the detection result by displaying the marks 801 indicating the reception of the touch operations at the coordinates where the touch operations are executed, and displaying the writing tool marks 804 near the individual coordinates, thus urging the user to execute the entry operation. After that, the control continues to execute drawing line segments along the loci of the contact points until each user disengages from the contact point.

Determination of whether the hands are of the same user or different users is carried out, for example, by extracting the regions where the image of the hands is picked up from the shadow images by the shadow region extraction unit 104, and determining the identification of the user by the feature point detection unit 105 from the difference in shape or size of the hands. Alternatively, the feature point detection unit 105 may determine the identification of the users in accordance with the luminance value (color) of the extracted hand regions. For example, a difference between average luminance values of-a plurality of hand regions is determined and, if the difference is within a predetermined threshold (an acceptable value as the difference of luminance between the left and right hands of the same user), it may be determined that the hands belong to the same user.

Next, by referring to FIG. 17, determination processing for determining the type of each operation mode (response) executed by the two-point touch operation as illustrated in FIG. 16 is described. FIG. 17 is a flowchart illustrating the process flow of a determination method of a result of the two-point simultaneous touch operation.

In S2001, the shadow region extraction unit 104 extracts shadow regions, as in S1001, while extracting the hand region sandwiched between the shadow regions. The process proceeds to S2002 (S2001).

In S2002, the feature point detection unit 105 detects the feature points, as in S1002 to S1003. At this time, however, the feature point detection unit 105 analyzes the data of the hand region obtained in S2001 to detect hands and fingers from which the feature points are derived, and also generates the hand and finger information indicating the detection result (S2002). The process proceeds to S2003. If, for example, plural hands are detected, the processing also includes detecting a difference between the left and right hands, which will be described later, and analogizing which hands belong to the same person according to the length of the hands and fingers or the distance d between the feature points.

In S2003, the control unit 110 determines whether the hands and fingers at the, contact points are of the same hand in accordance with the hand and finger information generated by the control unit 110 in S2002 (S2003). If the fingers belong to the same hand (S2003/Yes), the process proceeds to S2004. If the fingers belong to different hands (S2003/No), the process proceeds to S2005.

In S2004, the rotating arrow mark 803 (see FIG. 16), which is displayed in the rotating operation mode, is displayed, and the process ends.

In S2005, the, control unit 110 refers to the hand and finger information of S2002 to confirm if the operation is the two-point touch action by different hands and fingers of the same person (S2005/Yes). The process proceeds to S2006. If the operation is the two-point touch action by different persons (S2005/No), the process proceeds to S2007.

In S2006, the display control unit 1 displays the arrow marks 802 (see FIG. 16) displayed in the zoom operation mode (S2006).

Similarly, in S2007, the display control unit 111 displays the writing tool marks 804 displayed in the entry operation mode (S2007).

After that, the process returns to step S2001, and the projection video display device 1 repeats the processing. The projection video display device 1 repeats the processing from steps S2001 to S2007 in actual time (time sufficiently short for the user to aware/recognize the change of the display). When the main power is turned off or an interrupt signal to interrupt the operation object function is input during any step, an interrupt signal is input to the projection video display device 1, and the process ends.

According to the present embodiment, the projection video display device 1 can accurately determine the touch operation at a plurality of points and offer a response thereto, thus achieving an elect of enabling immediate feedback to the user operation and improving usefulness of the device.

The above description corresponds to the case where the two point touch operations occur simultaneously, but similar processing, is carried out for the three or more points. Namely, if plural hands are present in the picked-up image by the camera 100, all hands are detected and compared to identify which hands belong to the same person, and the shadow regions and the hand region data are analyzed to determine which feature points of the individual hands and fingers belong to which hands. Accordingly, the control unit 110 and the display control unit 111 can grasp which hands and fingers of the same person or different persons have executed touch operations at which coordinate points. The operations are classified in accordance with the above, as in the process steps after S2003, and the display is controlled according to the classification.

<Second Embodiment>

In one example, the projection video display device 1 can be used in such a manner that the video output device 4 displays data of design drawing created by a computer aided design system (CAD) and the projection video display device 1 projects and displays the data screen, hi this case, both an object (display target) and a camera (viewpoint of the user) are operation targets in virtual three-dimensional space and require various functions.

In a second embodiment, therefore, the projection video display device 1 detects the movement of the operation object (including fingers of the hands of the user and a dedicated pen) to execute an entry operation to the drawing that is projected and displayed, an erase operation to cancel the entry operation, and a view operation to confirm the object from various directions by operating the object and the camera.

Although the present embodiment is described with respect to a case where the present invention is applied to the three-dimensional CAD, the present invention is not limited to the operation example of the three-dimensional CAD. For example, when a general-purpose PC is used as the video output device 4 to operate multi-functional application, it is impossible, in many cases, to execute all functions only by operating a mouse. Therefore, a predetermined operation is executed, for example, by making combinations of function keys (Ctrl or Shift) on the keyboard or switching the operation mode by pressing a function switching button prepared on GUI of the application.

Figure 19:
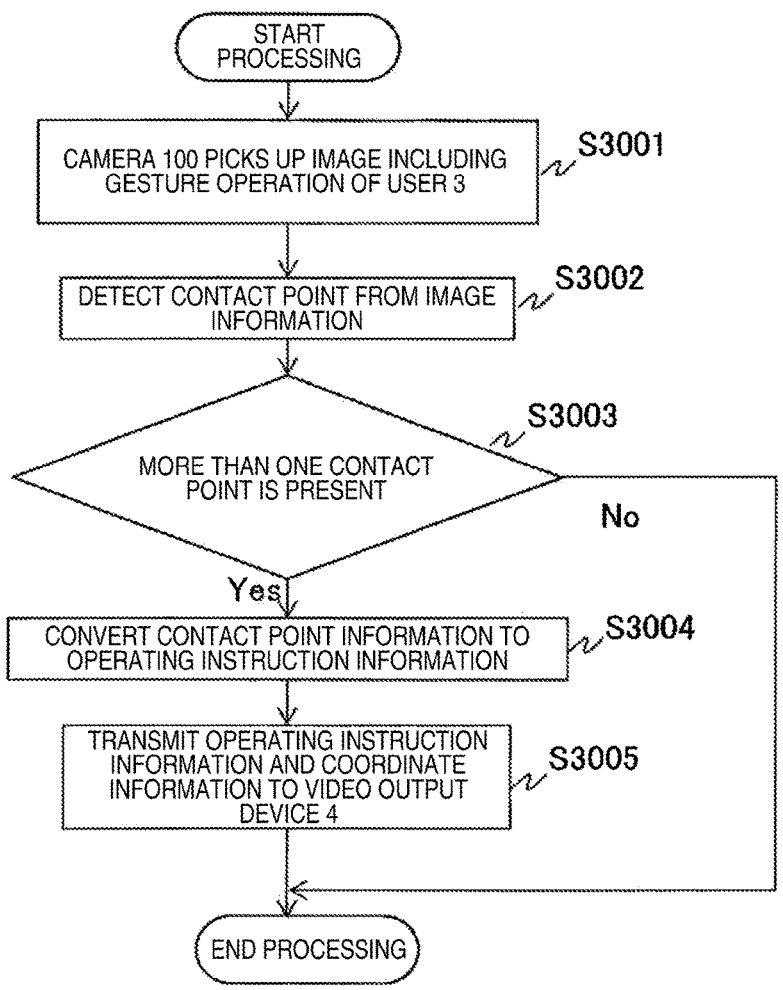
FIG. 19 is a flowchart illustrating the process flow of a transmission method of operating instruction information to a video output device from the projection video display device.

Referring to FIGS. 18 and 19, the second embodiment is described below. FIG. 18 illustrates an example operation method for viewing three-dimensional CAD data drawings. FIG. 19 is a flowchart illustrating the process flow of a transmission method of operating instruction information to the video output device 4 from the projection video display device 1.

FIG. 18 illustrates an example of analyzing the image acquired by the camera 100 as described by referring to FIGS. 7 to 16, and substituting the presence or absence of a plurality of contact points and the operations by operation (movement) of the hands and fingers of the PC.

FIG. 18, column A, illustrates a list of executable functions. Among these functions, "write" and "delete" are functions for displaying characters and graphics on the screen as a result of processing in the projection video display device 1. "Pointer operation" (operation to move a pointer in X or Y direction) is a function for carrying out a pointer operation on the video output device 4. "Object control" (corresponding to the view operation) is a function for operating the display target with the three-dimensional CAD. As described above, the three-dimensional CAD may also include the function to control the camera, but many applications software switch to determine which to be operated by assigning the functions like the operation of the object control.

Column B illustrates examples of user actions in executing individual functions listed in Column A when a mouse and a keyboard are available as the input devices for the general-purpose PC. "Pointer operation" of Column A corresponds only to the "mouse operation" (only indicating the mouse moving operation).

"Translation (X, Y)" of "object control" corresponds to a mouse dragging operation in a translating direction. "Rotation (X, Y)" (rotating operation about X- and Y-axes) corresponds to a mouse dragging operation while holding down the Ctrl key, "Rotation (Z)" (rotating operation about Z-axis) corresponds to a mouse dragging operation to the left and right while holding down the Ctrl Key. "Expansion/Reduction (=Translation Z)" corresponds to a mouse operation while holding down the Alt key.

Column C of FIG. 18 illustrates gesture operations corresponding to the PC operations listed in Column B. The gesture operations include two types of operations including a touch operation mode and an aerial operation mode (see FIG. 15) according to whether the finger of the user touches the projection surface 3. A pointer operation which is a basic interactive function is assigned to the aerial operation and the touch operation carried out with any one finger of the right hand. By commonly assigning the basic operations as in use of other applications, an effect of improving usefulness to the user is obtained.

For example, the "translation (X, Y)" of the "object control" is established by assigning a gesture operation of moving several fingers of the right hand from left to right or up and down in the aerial operation mode. The "rotation (X, Y)" of the "object control" is established by assigning a gesture operation of moving several fingers of the right hand in the aerial operation mode while executing the touch operation with the middle finger of the left hand. The "rotation(Z)" of the "object control" is established by assigning a gesture operation of moving several fingers of the right hand in the aerial operation mode while executing the touch operation with the middle and index fingers of the left hand. Namely, the aerial operation of several fingers of the right hand is assigned to right-click of the mouse, the touch operation of the index finger of the left hand is assigned to pressing down the Alt key, and the touch operation of the middle finger of the left hand is assigned to pressing down the Ctrl key. The "expansion/reduction (=translation Z)" of the "object control" is established by assigning a gesture operation of moving several fingers of the right hand in the aerial operation mode, while carrying out the touch operation with the index finger of the left hand.

To implement these actions, when the operation is executed, like the interactive function, with respective to the display screen 20, the control unit 110 determines the content of the operation from the shape of the hands and fingers, and the display control unit 111 controls the display screen in accordance with the content. Meanwhile, when the view control is executed, it is necessary that the control unit 110 generates the operating instruction information according to the shape of the hands and fingers and informs the content of the information to the external video output device.4. FIG. 19 illustrates the process flow of this processing.

The process flow of FIG. 19 is continuously repeated to execute control in such a manner that the presence or absence of the touch of the fingers on the projection surface 3, the change of coordinates of the contact points, and so on can be acquired and changed in actual time (time sufficiently short to allow the user to perceive and recognize the change of display).

In S3001, the camera 100 obtains the image data including the gesture operations of the user 6 and the process proceeds to S3002 (S3001).

In S3002, according to the procedure described by referring to, for example, FIG. 13 or 17, the touch operation point or the aerial operation point (these two operation points are collectively referred to as the operation point) of the fingertip on the projection surface 3 are detected, and the process proceeds to S3003 (S3002). When a plurality of operation points is present, the coordinate information for each operation point is obtained and stored in a memory. Meanwhile, from the shape of the hands and fingers, it is determined with which finger of the left or right hand the operation is executed, and the determination is also stored in the memory.

In determining the left hand or the right hand, the position of the thumb can be analogized from the positions of the feature points of the image, such as the image illustrated in FIG. 11, in which the image of the open hand is picked up, and the determination between right and left can be carried out in accordance with the analogy. Alternatively, in another example, several shapes of hands or shadow image data are previously recorded in a nonvolatile memory so that the determination can be carried out according to the degree of similarity to the shape of the hands or shadows in the image taken.

In S3003, the process is branched according to the presence or absence of the touch operation point or the aerial operation point. When the control unit 110 determines that one or more operation points are present (S3003/Yes), the process proceeds to S3004. When the control unit 110 determines that no operation point is present (S3003/No), the process returns to step S3001 and is repeated.

In S3004, the control unit 110 compares the information of the aerial operation with the information of the previous processing to convert the contact point information into the operating instruction information (S3004). The contact point information includes the presence or absence of the contact points and, if the contact point is present, also includes the coordinate information indicating the coordinates of the contact points. If, for example, the previous processing has included no contact points nor aerial operation points, but the aerial operation of the index finger is detected this time in S3002, the control unit 110 then generates the operating instruction information to left-click the mouse button in the example illustrated in FIG. 19.

If, for example, the previous state in which the aerial operation point of the index finger of the right hand has been detected changes to a state in which the number of fingers of the right hand that operate the aerial operation becomes zero or the aerial operation changes to the touch operation, the operating instruction information to left-click the mouse button is deleted.

Similarly, when the touch operation of the left hand is detected, the operating instruction information to press down the Alt key or the Ctrl key is generated in accordance with the finger identified in S3002. Meanwhile, the operating instruction information is not generated if no change necessary for generation of the information occurs. Information as to which operating instruction information should be generated when which kind of change occurs is previously prepared on the memory, and the above-described determination is carried out by referring to such information. The control unit 110 records the operation state in the memory, and the process proceeds to S3005.

In S3005, the control unit 110 transmits the operating instruction information and the coordinate information obtained in S3004 to the external video output device 4 according to a predetermined communication format, and the process ends. If more than one piece of operating instruction information is obtained, the information is transmitted continuously. The predetermined communication format may be the format which is in compliance with the transmission of the operating instruction information by the mouse or the keyboard connected to the PC, or may be a unique format capable of interpreted by both devices.

Subsequently, the video output device 4 changes the display content in accordance with the received operating instruction information, as in the case where a predetermined mouse operation or key operation is carried out.

According to the present embodiment, the aerial operation by the right hand is assigned to the mouse operation and the touch operation by the left hand is assigned to the key input operation, so that the user 6 can operate the display content intuitively and easily on the projection surface 3, thus achieving the effect of improving usefulness.

In the present embodiment, with respect to the height (level) of the proximity A illustrated in FIG. 14, the level at which the level 3 is determined may be higher than the normal level, or the detection width for each level may be widened, to facilitate execution of the aerial operation.

In addition, the assignment of the operation method by the projection device with respect to the operation by hands and fingers and the operation in the PC, as illustrated in FIG. 18, may differ from the assignment described in the above embodiment. For example, the write operation may be limited to the touch operation with the index finger, and the pressing down the Ctrl key and the Alt key may be assigned to the touch operation with the thumb and the middle finger of the right hand. As a result, the above-described series of functions can be achieved only by the right hand operation. Further, if the dedicated operation tool (light-emitting pen) is available, the write and delete functions are carried out with the operation tool, so that the hands and finger operations can be assigned to the pointer operation and the control of the object and the camera.

The method of assigning the operations can be set by the user. Referring to FIG. 20, an example of setting corresponding relation between the shape of hands and fingers and the operating instruction information is described. FIG. 20 illustrates an operation instruction information registration screen in which corresponding relation between the shape of hands and fingers and the operating instruction information is set, in which (a) is a screen example for selecting the shape of hands and fingers using options and (b) is a screen example using illustration of hands and fingers. The setting screens of FIG. 20 are called using an operation key (not illustrated in FIG. 2) provided in the body of the projection video display device 1 or a remote controller (again, not illustrated in FIG. 2). Accordingly, the setting menu is displayed on the projection surface 3, or on a part of or the entire surface of the display screen 20. By operating the setting menu, various elements, such as luminance, colors, a display position, an installation method, or the communication method with the external video output device 4 of the projection surface, can be set. Items illustrated in portions indicated by a reference sign 901 (ranges surrounded by broken lines) of FIG. 20 are the list of large categories of the setting items. For example, if the user 6 presses up and down buttons among the operation keys appropriately to select "operation information", then a registration screen for registering a desired shape of the hands and fingers for each piece of operating instruction information is displayed.

An operation information registration screen of FIG. 20(*a*) represents how the shape of the hands and fingers to be assigned to the Ctrl key is updated. Options to be selected are previously prepared in the memory of the projection video display device 1. The user 6 selects a desired shape of the hands and fingers with the up and down buttons among the operation keys. Other operating instruction information is also set in a similar manner, and when the selection is completed for all operating instruction information, the left key is pressed to determine the options. If the initialization indicated on the bottom is selected, initial assignment of the shape of the hands and fingers that is previously recorded in the non-volatile memory can be resumed. In selecting the shape of the hands and fingers, it may be possible not to register the registered shape which is already registered as another operating instruction information, or provide an option not to register any shape of hands and fingers. It may also be possible to provide an error notification when all settings for the entire operating instruction information is completed and the same shape is selected in duplicate.

FIG. 20(*b*) is another example of the operation information registration screen in which the registration is carried out by the user 6 by actually imitating the shape of hands and fingers (gesture operation) that the user 6 desires to register, instead, of providing options. The user 6 keeps the posture that the user 6 desires to register, and the projection video display device 1 detects the aerial operation and the touch operation of the hands and fingers, as in FIG. 12(*a*). When recognizing that the fixed shape has been kept for a predetermined time period, the projection video display device 1 updates the information in the internal memory to use the shape as the selected operating instruction information. At this time, the display region indicated by 902 displays, when not operated by the user 6, a registered shape of hands and fingers. If any operation by the user 6 is detected, the display region constantly displays the shape of the hands and fingers recognized by the control unit 110. This allows the user 6 to set the shape of the hands and fingers without fail, in the displayed example, it is indicated that the user 6 has registered the touch operation with the index finger of the left hand. In the setting, it is possible to notify the user 6 of the fact that the same operation of any one of the fingers desired to use in the designated shape of hands and fingers is already set for other operating instruction information. Alternatively, the shape of hands and fingers may not be registered (the right-click the button of the operation key in FIG. 20(b)). In the registration, the user 6 may be informed of the presence of unfeasible operation, if any, during the operations. This may be executed, because, for example, if the aerial operation of the middle finger of the right hand is assigned to pressing down the Ctrl key, the use case of moving the pointer while pressing the Ctrl key cannot be satisfied.

In both examples of FIG. 20(a) or (b), the operation of the external video output device 4 (the general-purpose PC) can be substituted for by the registered shape of hands and fingers once the determination and registration are completed.

<Third Embodiment>

In one example of using the projection video display device 1, a use scene of projection on the wall, as illustrated in FIG. 2, is available in order to give a presentation to many persons. At this time, the user 6 who uses the projection video display device 1 may carry out a finger-pointing operation on the projection surface 3, or a write operation to make additional entry to the display content. In doing this, if the operations are discriminated, for example, by displaying the finger-pointing operation with a pointer in the aerial operation mode and carrying out the write operation in the touch operation mode, such a scene would be probable that the user 6 carries out the operation on the display surface located behind the user 6, while the line of sight of the user 6 directing toward the audience side. Thus, it is desired to prevent a mistake in that the touch operation is carried out although the aerial operation is intended.

The third embodiment is made in view of the above situation, and aims to prevent an erroneous operating instruction due to an unintended touch operation that is not desired by the user. The third embodiment is described below by referring to FIGS. 21 to 24.

Figure 21:
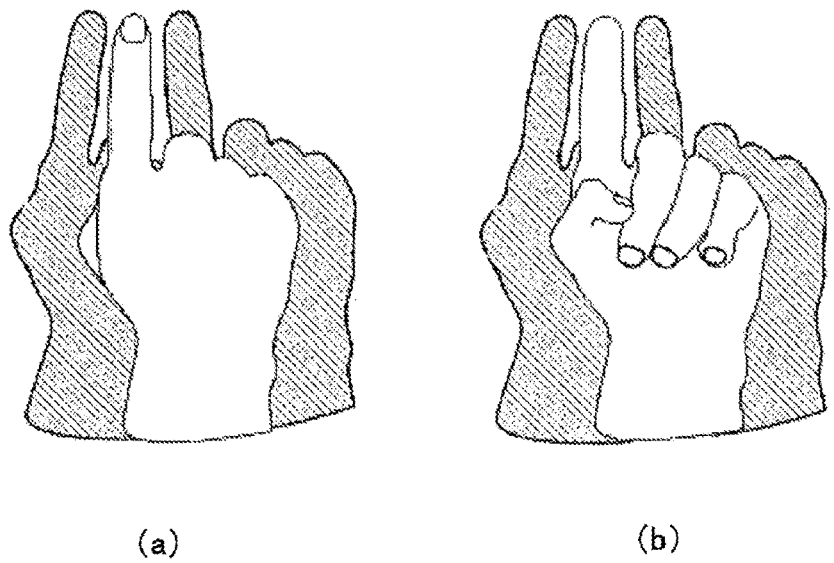
FIG. 21 is a schematic view of a touch operation by the left and right hands, in which (a) illustrates the operation by the right hand when the user projects the index finger with the back of the hand facing the user side and (b) illustrates the operation by the left hand when the user projects the index finger with a palm facing the user side.

FIG. 21 is a schematic view of a touch operation by the left and right hands, in which (a) illustrates the operation by the right hand when the user projects the index finger with the back of the hand facing the user side and (b) illustrates the operation of the left hand when the user projects the index finger with a palm facing the user side.

In the operations illustrated in FIGS. 21(a) and (b), the feature points of the shape of shadows of the hands extremely resemble each other. If the back and the palm of the hand and the direction of the hand (difference between front and back) are falsely recognized, the recognition of with which finger the operation is carried out becomes wrong, causing the input of the operating instruction information by the gesture operation to be carried out mistakenly. Therefore, a processing example to detect the difference of the hands is described below. Similarly, the left hand with its back facing the front and the right hand with its palm facing the front can be determined.

The feature point detection unit 105 calculates a luminance distribution of the hand shape portion sandwiched between shadows according to the shape of the shadow regions 401, 402. The luminance distribution of the back of the hand is substantially uniform, but the luminance distribution of the palm is varied due to the influence of the shadow of fingers or nails. The left or right can be determined in this manner. Alternatively, the determination can also be possible according to the presence or absence and the coordinates of finger nails of the fingers of hands by detecting the nail portions of the hand from the image. When the right and left illumination units 101 and 102 emit near-infrared light, the image of veins of the hands and fingers can be picked up by the camera 100. The determination is then carried out according to the degree of similarity between the image of the shape of the veins of the back and palm of the hand, which has previously been picked up and kept, and the current image of the shape of the veins of a hand-like portion that is being picked up.

Figure 22:
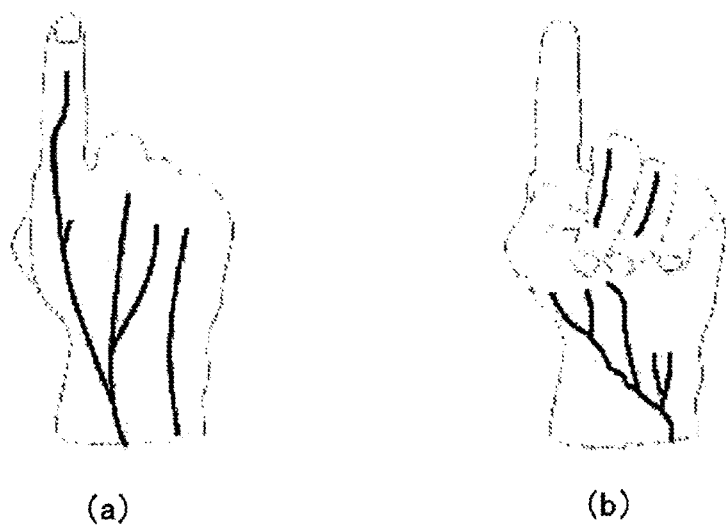
FIG. 22 is a schematic view of the shape of veins to be obtained, in which (a) illustrates the right hand with the back of the hand facing the front and (b) illustrates the left hand with the palm facing the front.

The shape of the veins is described by referring to FIG. 22. FIG. 22 is a schematic view of the shape of the veins to be obtained, in which (a) illustrates the right hand with the back of the hand facing the front and (b) illustrates the left hand with the palm facing the front. If the picked-up image includes a vein penetrating from the wrist to the fingertip as illustrated in (a), it may be determined that the image is the back side of the hand. The determination is also possible by determining whether the tree-like shape of the veins more closely resembles (a) or (b).

The determination is carried out similarly when the finger other than the index finger is projecting or plural fingers are projecting. In the case of projecting the thumb, for example, the feature points of the thumb can be obtained so that the left or right hand can be determined according to the position of the feature points.

The determination is also possible by a plurality of combinations of the above methods. If the determination is not possible in a case, for example, where the user 6 wears gloves, the determination of the hand shape portion may not be carried out and, for example, a message indicating that the determination is not feasible is displayed on the screen.

FIG. 23 illustrates the shape of the hands and fingers for the user operations from the front and the side, in association with the response output from the projection video display device 1 responding to the user operations. Operation 1 indicates a case where write processing is carried out by a normal touch operation. In this case, the display control unit 111 displays the reception mark 801 near the contact point of the fingertip and the writing tool mark 804 indicating that the write processing is feasible, thus notifying the user 6 of the fact that the write operation is determined.

Operation 2 is a case where the fist portion as well as the fingertip are touching. In this case, the contact point detection unit 107 detects the contact points, but the control unit 110 then determines that the touch of the fingertip is invalid. As a result, the display control unit 111 does not display the reception mark near the contact point of the fingertip and continues to display the pointer that is to be displayed during the aerial operation.

Operation 3 is a case where the fingertip is not in the touch state and only the fist portion is in the touch state. This case can be determined as the normal aerial operation mode according to the shadow shape of the fingertip. The display control unit 111, therefore, controls so that the pointer is displayed.

Operation 4 is a case where the hand in the touch state with the direction of the front and the back of the hand being reversed. The front and the back of the hand can be detected by the method described by referring to FIGS. 22 and 23. When the hand is detected with the palm facing the front (i.e., the back of the hand is facing the projection surface 3), the control unit 110 determines that the touch of the fingertip is invalid and the display control unit 111 does not display the reception mark near the contact point of the fingertip.

Alternatively, the display control unit 111 may continue to display the pointer that is intended to display during the aerial operation.

In the case of the hand shape illustrated in Operation 2, it would be desirable for the user that, when the projection video display device 1 is installed and used on the table (see FIG. 1), the touch of the fingertip should be accepted to allow execution of the write operation. Therefore, a gyro sensor, for example, may be mounted on the projection video display device 1, so that the control unit 110 can determine the projecting direction of the projection unit 115 in accordance with detection result information, in which the projecting direction of the projection unit. 115 is detected, or information in which the projection direction is set by the user from the setting menu screen (not illustrated). As a result, the write operation may be valid in Operation 2 when the projection surface is horizontal, but the write operation may be invalid when the projection surface is vertical (inclined at an inclination angle not smaller than a predetermined angle relative to the horizontal plane). Thus, it can be determined whether the touch operation mode is valid or invalid in accordance with the determination including the installation method of the projection video display device 1.

According to the present embodiment, the projection video display device 1 can detect improper touch to prevent the write processing caused by the erroneous gesture operation, thus achieving the effect of improving usefulness.

Figure 24:
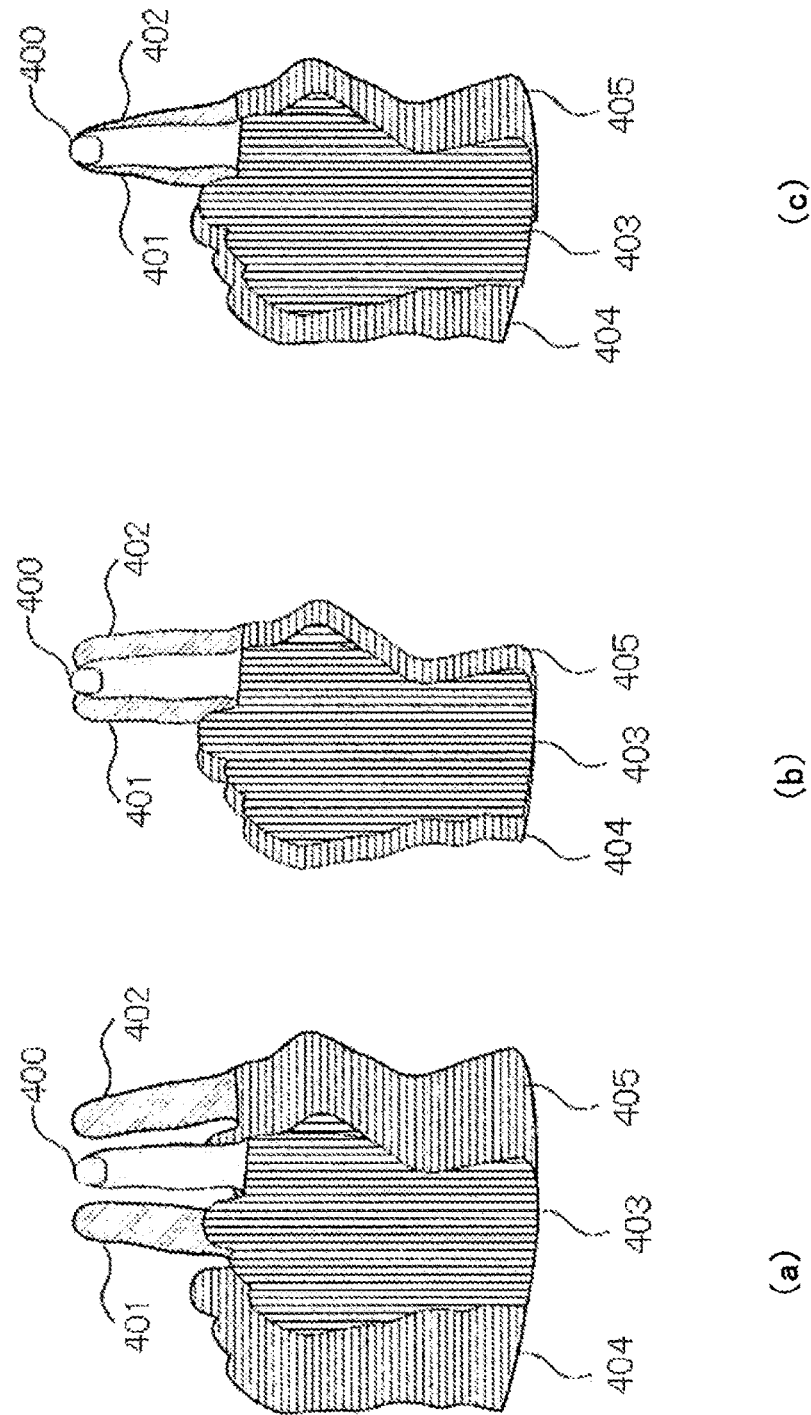
FIG. 24 illustrates determination processing of determining the presence or absence of the touch of a fist portion, in which (a) illustrates shadows of the hands and fingers in a non-contact state, (b) illustrates shadows when only the fist is in a contact state, and (c) illustrates shadows when a finger is in a contact state (normal touch operation).

In the above embodiment, the touch of the fist portion is basically determined in accordance with the coordinates and the shape of the shadows of the picked-up image. Referring to FIG. 24, the determination processing of the presence or absence of touching of the fist portion is described. FIG. 24 illustrates determination processing of determining the presence or absence of touch of the fist portion, in which (a) illustrates shadows of the hands and fingers in the non-contact state, (b) illustrates the state of the shadow when only the fist is in the contact state, and (c) illustrates the shadow when the finger is in the contact state (normal touch operation).

The contact point detection unit 107 determines the presence or absence of touch of the fist portion from an area ratio between the shadow portion and the fist portion. The contact point detection unit 107 determines the presence or absence of the touching of the fist portion in accordance with an area ratio of a region 403 (portion filled with vertical line pattern in the drawing), which is a region excluding portions that change with the front and back movement of the finger from a shadow region 400 of the hands and fingers in FIG. 24, relative to regions 404, 405 (portions filled with horizontal line pattern in the drawing), which are regions similarly excluding portions that change with the front and back movement of the finger from shadow regions 401, 402. Namely, the contact point detection unit 107 determines the touching of the fist portion when an area of 403 divided by a total area of 404 and 405 is over a prescribed threshold (see FIG. 24(*b*)). In contrast, the contact point detection unit 107 determines non-touch of the fingertip and the fist when the shadows of the fingertip are detected at two points with the threshold not being, exceeded (see FIG. 24(*a*)).

Any value can be set as the threshold, but, for example, the shape of the shadows is measured when the user 6 carries out the normal touch action as illustrated in FIG. 24(*c*), and the area ratio of this measurement can be used as the threshold. By considering the personal difference for the area of the fist portion, the touch operation may be previously registered. Further, the shape of the hands and shadows change according, to the location of the user 6 who carries out the gesture operation on the projection surface 3. Therefore, the threshold may be corrected according to the positional relationship between the camera 100 and the right and left illumination units 101 and 102.

To obtain the shape of the hands and fingers from the side, another camera may be installed on the left or right of the projection surface 3 in the horizontal direction and a still another camera is installed vertically with respect to the camera 100 to obtain the image, so that the determination can be carried out in accordance with the obtained image. Thus, the side shape can be measured directly daring the user operation, for example, as illustrated in FIG. 24, allowing more accurate detection of the user operation.

<Fourth Embodiment>

When the writing is carried out on the projection surface 3, the user can improve expressiveness and convenience if the type or quality of the pen can be changed easily.

Figure 25:
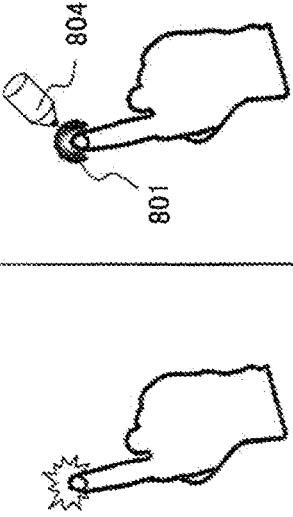
FIG. 25 illustrates the gesture operations with different numbers of fingers to be touched in association with the pens that differ in boldness, in which (a) illustrates a normal touch operation and (b) illustrates a touch operation with two fingers.
Figure 27:
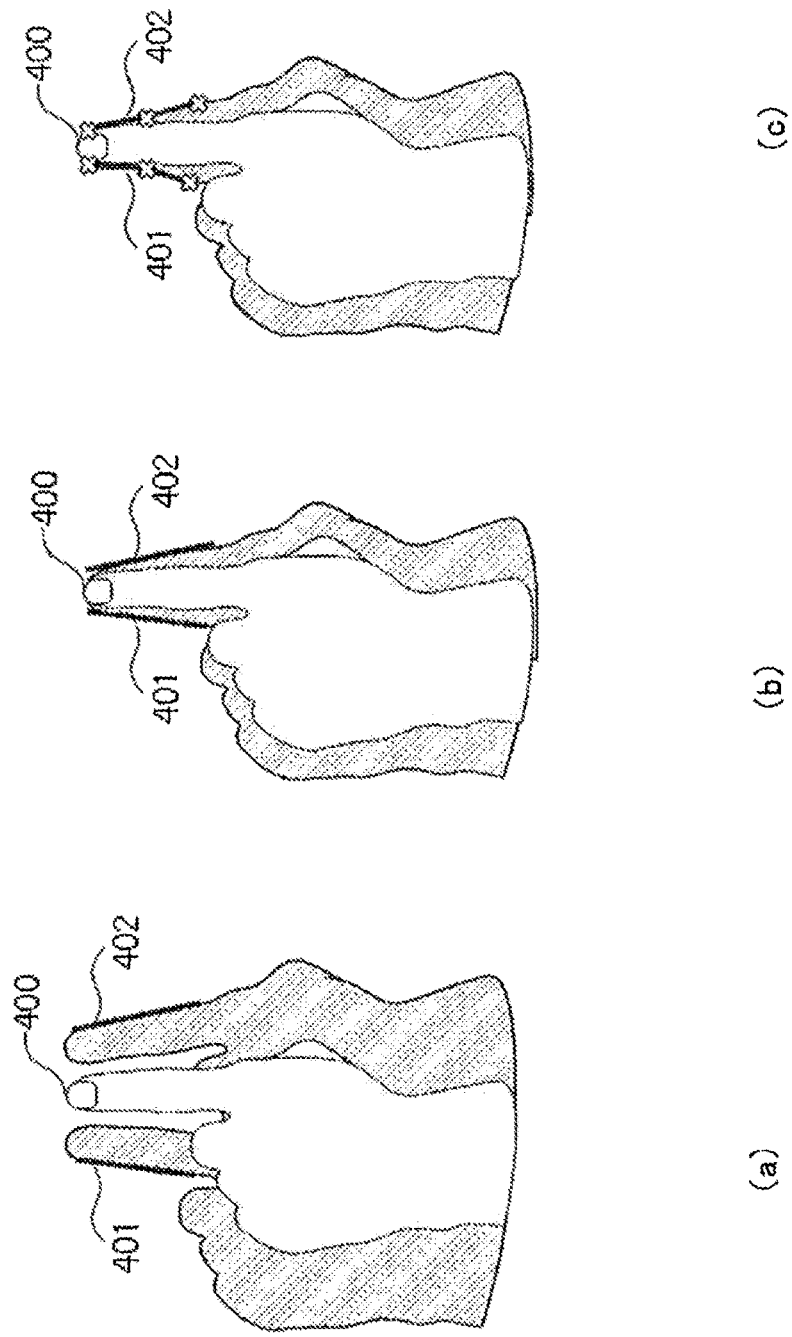
FIG. 27 illustrates the shape of shadows of the gesture operations with different finger pressure, in which (a) illustrates shadows in a non-contact state, (b) illustrates a shadow in a normal contact state, and (c) illustrates a shadow in the case of a strong finger pressure.

A fourth embodiment has been made in view of the above situation, and aims to designate a type or quality of the pen from the gesture operation. The fourth embodiment is described below by referring to FIGS. 25 to 27. FIG. 25 illustrates the gesture operations with different numbers of fingers to be touched in association with the pens that differ in boldness, in which (a) illustrates a normal touch operation and (b) illustrates a touch operation with two fingers. FIG. 26 illustrates the gesture operations with different finger pressure in association with pens that differ in boldness, in which (a) illustrates a normal touch operation and (b) illustrates a stronger touch operation (with a larger contact area of the fingertip). FIG. 27 illustrates the shape of shadows of the gesture operations with different finger pressure, in which (a) illustrates shadows in the non-contact state, (b) illustrates a shadow in the normal contact state, and (c) illustrates a shadow in the case of a strong finger pressure.

Operation 1 of FIG. 25 illustrates a so-called normal touch operation in;which the touch operation is carried out with a single index finger.

In contrast, Operation 2 of FIG. 25 illustrates the touch operation carried out by the user 6 with two fingers including the index finger and the middle finger together. In this case, the contact point detection unit 107 detects two contact points simultaneously, as in S2001 and S2002 of FIG. 17. Subsequently, the control unit 110 determines that these two points belong to a single touch operation according to the information indicating that the two contact points belong to the same hand and that a distance between the coordinates of the two contact points is smaller than a threshold. Thus, the control unit 110 regards the two contact points as a write operation with a pen that is bolder than the pen used in the normal touch operation.

The display control unit 111 may display the response mark 801 at the reference coordinate where the fingertip of the middle finger is detected, and display the writing tool mark 804 near the response mark 801. The reference coordinate may be a midpoint between the tips of the index finger and the middle finger.

After that, while the user 6 continues to move the fingers by maintaining the two fingers touching on the projection surface 3, the display control unit 111 draws a line segment display screen along the loci of the fingers.

Although the index finger and the middle finger are described as an example in the present example, a combination of other two fingers may be used for the similar processing, or the touch operation of a combination of three or more fingers may be used to respond similarly with each finger assigned with a different meaning. For example, if three fingers including the index finger, the middle finger, and the ring finger are used together to carry out the touch operation, a write operation may be carried out as with a further bolder pen, or an erase operation (erasing the display written so far by operating the pen) may be carried out by displaying an eraser icon.

FIG. 26 illustrates an example in which the response to the user 6 changes due to the difference of finger pressure of a single finger. Operation 1 of FIG. 26 illustrates the write operation by the normal touch operation. In this state, when the user 6 further presses the finger, the hand and the finger of the user changes to the operation shape illustrated in Operation 2. When the control unit 110 determines the further pressing of the finger from the state of the image picked up by the camera 100, or determines the increase of the finger pressure, the display control unit 111 then switches the operation to the pen operation with a bolder pen.

FIG. 27 illustrates the processing of recognizing the intensity of the finger pressure illustrated in FIG. 26 according to the shape of the shadows. FIG. 27(b) illustrates the shape of the shadows during the normal touch operation (corresponding to Operation 1 of FIG. 26). When the finger pressure increases, the contour lines of the shadow shape changes to warp inward from linear lines. The control unit 110 determines the increase of the finger pressure when an angle of warping of the shadow shape exceeds a certain threshold (see FIG. 27(c)), so that the display control unit 111 can respond as illustrated in Operation 2. FIG. 27(a) illustrates the shadow shape in the non-contact state in which the hands and fingers do not touch the projection surface 3. When the contact point detection unit 107 detects shadows of two fingertips, the control unit 110 determines the shadows as in the non-contact state.

To obtain the shape of the hands and fingers from the side, another camera may be installed on the left or right of the projection surface 3 in the horizontal direction and a still another camera is installed vertically with respect to the camera 100 to obtain the image, so that the determination can be carried out in accordance with the obtained image. Thus, the side shape can be measured directly during the user operation, for example, as illustrated in FIG. 27, allowing more accurate detection of the user operation.

Although the output mode of the present embodiment has been described to change in two stages, it is also possible to control in a manner that a change caused by the state of the finger pressure is taken as a continuous quantity, and the boldness of the pen is switched in many stages.

Further, a difference of entering angles, of the fingers may also be used, instead of the state of the finger pressure, during the operation on the projection surface 3. Namely, when the touch operation is carried out, for example, in a direction closer to the vertical direction, the picked-up shape of the shadow has a large angle at the intersection of two straight lines of the shadow regions 401, 402. In contrast, when the touch operation is carried out in the state in which the fist portion is laid (lose to the projection surface 3), the angle of the intersection of two straight lines of the shadow regions 401, 402 is small. With a certain value used as a threshold, the operation similar to Operation 2 of FIG. 26 is responded when the angle is smaller than the threshold. In this example, it is also possible to install another camera vertically with respect to the camera 100 to obtain the image, so that the determination can be carried out from the image data to allow more accurate detection of the user operation.

In the above embodiment, the user can change the type of the write operation by a simple method, thus of the effect of improving usefulness of the device.

<Fifth Embodiment>

Figure 28:
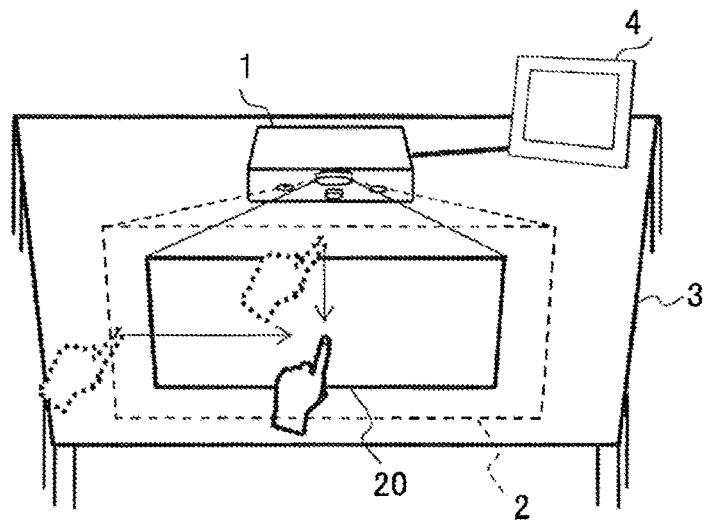
FIG. 28 is an example of an operation method carried out from the outside of the display screen.
Figure 29:
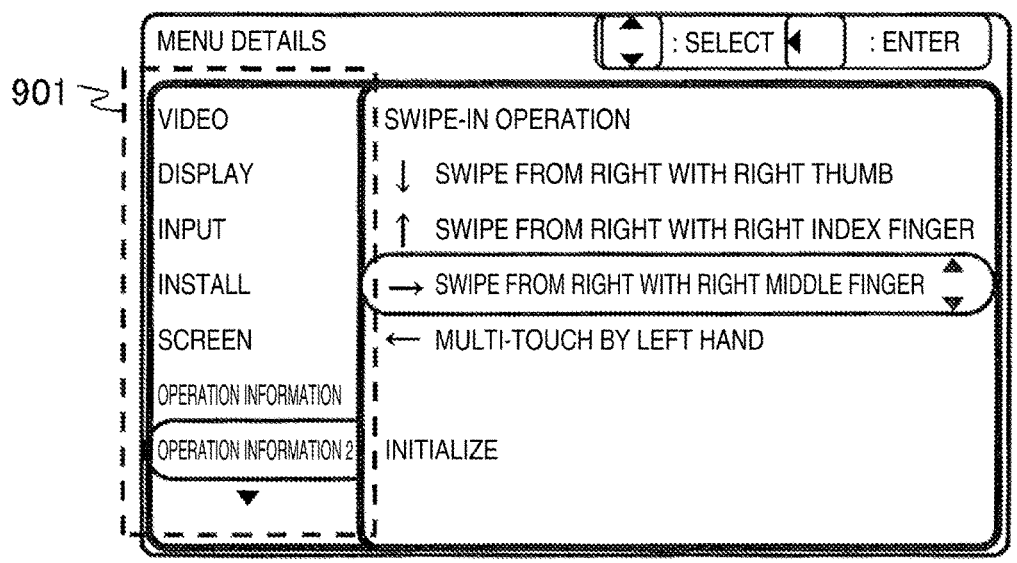
FIG. 29 illustrates an example of a setting menu display of the projection video display device with an operation detection function.

A fifth embodiment illustrates an example control method with hands and fingers when a tablet device, for example, is used as the external video output device 4 by connecting such a tablet device to the projection video display device 1, in which the tablet device includes a touch panel and can carry out touch operations (including swipe-in to slide the screen from the outside of the display screen to the inside of the screen, and swipe-out to slide the screen from the inside of the screen to the outside of the display screen) using the frame portion outside the display screen. The fifth embodiment is described below by referring to FIGS. 28 and 29. FIG. 28 illustrates an implementation example of the operation by hands and fingers from the outside of the display screen 20 on the projection surface 3. FIG. 29 illustrates a setting screen for assigning gesture operations to swipe-in operations.

As illustrated in FIG. 28, the user 6 starts the touch operation from a region of the projection video display device 1 where the operation can be detected and no video is displayed, that is, the region outside the display screen 20 and inside the maximum projection range 2. The user 6 then moves the hands and fingers into a region of the display screen 20 by maintaining the touch state. The control unit 110 can detect the operation from outside to inside of the region of the display screen 20 using the coordinate information of the display screen and the contact point information obtained from the image information of a plurality of consecutive images picked up by the camera 100.

At this time, as in the second embodiment, the operating instruction information is generated corresponding to the operation of the hands and fingers carried out from outside to inside of the region of the display screen 20, and the operating instruction information is transmitted from the projection video display device 1 to the video output device 4.

Thus, it is possible to provide equivalent functions with equivalent operational feeling as in operating the touch panel, preventing the decrease of usefulness for the user and achieving the effect of intuitive control.

However, the size of the display screen may become large, or the user 6 may not carry out the touch operation in some regions depending on the position of the projection surface and the position of the user 6. Similarly to the second embodiment, therefore, the swipe operations can also be assigned to certain shape of the hands and fingers in the second embodiment.

For example, in the setting screen illustrated in FIG. 29, the operation from the right and from the outside of the display screen or the touch operation with plural fingers of the left hand are assigned to the swipe-in operations in four directions including up, down, left, and right directions in accordance with the standing position of the user.

According to the present embodiment, the swipe-in operation can be executed in carrying out the gesture operation in the outside region of the display screen 20 so long as the region falls within the maximum projection range. This improves the usefulness for the user.

If the swipe-out operation (operation from the inside of the display screen to the frame portion outside the display screen) can be executed in the video output device 4, it is possible to similarly transmit the operating instruction information to the video output device 4 or set given shape of the hands and fingers. Further, by determining whether the video output device 4 is in compliance with the swipe function, the display or no-display of the setting menu for the swipe function may be changed.

The embodiments described above are not intended to limit the scope of the present invention, and various changes in the form of the embodiments may be made without departing from the spirit of the present invention, in which such changes are also included in the technical range of the present invention.

REFERENCE SIGNS LIST

1 Projection video display device
2 Maximum projection range
3 Projection surface
4 Video output device
5 Video transmission cable
20 Display screen
100 Camera
101 Right illumination unit
102 Left illumination unit
115 Projection unit

The invention claimed is:

1. A projection video display device comprising:
    a projector configured to project a display video on a projection surface;
    an imager configured to image the projection surface to generate a picked-up image;
    a communication interface communicatively coupled to a computer; and
    a processor communicatively coupled to the projector, the communication interface and the imager;
    wherein in the processor is configured to:
    detect a state of an operation object based on the picked-up image,
    generate operating instruction information indicating content of an input operation in accordance with the state of the operation object detected,
    detect a movement of the operation object and an attribute of the operation object that indicates a state of the operation object other than the movement of the operation object,
    generate first control information for enabling a pointer operation input to the computer in accordance with the movement of the operation object detected,
    generate second control information for enabling a predetermined key input to the computer in accordance with the attribute of the operation object detected, and
    transmit, using the communication interface, the first control information and the second control information to the computer.

2. The projection video display device according to claim 1, wherein the processor further
    controls the projector to project a setting screen for assigning the attribute of the operation object to the key input.

3. The projection video display device according to claim 1, wherein the attribute of the state of the operation object includes proximity of the operation object to the projection surface,
    wherein the processor is further configured to;
    when the proximity is at a maximum extent of the projection of the display video, generate the first control information for displaying the operation pointer used for the pointer operation input and the second control information for switching to a touch operation mode in which the operation object is made to touch the projection surface and operated, and
    when the proximity is less than the maximum extent of the projection of the display video, generate the first control information for displaying the operation pointer, and the second control information for switching to an aerial operation mode in which the operation object is operated without touching the projection surface.

4. The projection video display device according to claim 1, wherein
    the operation object is a hand and a finger of a user, and
    the attribute of the operation object includes information indicating a hand or finger of the user with which an operation is carried out.

5. The projection video display device according to claim 1, wherein
    the operation object is a hand or a finger of a user, and
    the attribute of the operation object includes information indicating whether a palm side or a back side of the hand of the user faces the imager.

6. The projection video display device according to claim 1, wherein
    the operation object is a hand or a finger of a user, and
    the attribute of the operation object includes information for determining how many fingers of the hand of the user are operated simultaneously, or whether a finger pressure of the hand of the user is strong or weak during touching on the projection surface.

7. The projection video display device according to claim 1, wherein the picked-up image includes a display region in which the display video is displayed by the projector, and a region adjacent to the outside of the display region,
    wherein the processor is further configured to:
    detect that the operation object moves toward the display region from a region outside the display region and inside the picked-up image and reaches the display region, and
    generate the first control information when the operation object reaches the display region.

8. The projection video display device according to claim 1, wherein
    the input operation by the pointer operation input and the key input is carried out to set at least one operation mode among a display mode of the operation pointer in carrying out the pointer operation input, a write mode for entering characters, an erase mode for erasing characters, a rotating operation mode for rotationally displaying a partial region included in the display video, and an expansion and reduction mode for expanding or reducing the partial region.

9. The projection video display device according to claim 8, wherein the processor is further configured to:
    receive, using the communication interface, a video signal that includes at least a mark indicating the operation pointer or the operation mode from the computer, wherein the video signal is generated in accordance with the first control information and the second control information, and
    control the projector to project the video signal.

10. The projection video display device according to claim 9, wherein the processor is further configured to:
    generate a video that is superimposed on the video signal, wherein
    the video includes at least a mark indicating the operation pointer or the operation mode in accordance with the first control information and the second control information, and
    control the projector to project the video that is superimposed on the video signal.

11. A video display method comprising:
projecting, by a projector, a display video image on a projection surface;
receiving, by a processor that is communicatively coupled to the projector, a picked-up image from an imager, wherein the picked-up image is an image of the projection surface;
detecting, by a processor, a movement of an operation object based on the picked-up image;
generating, by the processor, first control information for enabling a pointer operation input to a computer in accordance with the movement of the operation object;
generating, by the processor, second control information for enabling a predetermined key input to the computer in accordance with an attribute of the operation object detected;
transmitting, by the processor, the first control information and the second control information to the computer; and
projecting, by the processor, a video on the projection surface using the projector, wherein the video includes at least a mark indicating an operation pointer and an operation mode generated in accordance with the first control information and the second control information.

* * * * *